(12) United States Patent
Tedesco

(10) Patent No.: US 8,493,226 B2
(45) Date of Patent: Jul. 23, 2013

(54) BATTERY CHARGER LOSS PREVENTION ADAPTOR HAVING A NOTIFICATION MODULE

(76) Inventor: Brian Tedesco, Ridgewood, NJ (US)

( * ) Notice: Subject to any disclaimer, the term of this patent is extended or adjusted under 35 U.S.C. 154(b) by 420 days.

(21) Appl. No.: 12/897,268

(22) Filed: Oct. 4, 2010

(65) Prior Publication Data

US 2011/0050447 A1    Mar. 3, 2011
US 2011/0227749 A2    Sep. 22, 2011

Related U.S. Application Data

(60) Provisional application No. 61/378,054, filed on Aug. 30, 2010.

(51) Int. Cl.
*G08B 21/00* (2006.01)
(52) U.S. Cl.
USPC ............. 340/687; 340/539.1; 340/539.13; 340/568.1
(58) Field of Classification Search
USPC ............ 340/539.1, 539.11, 539.13, 568.1, 340/572.1, 573.1, 686, 687, 691.1
See application file for complete search history.

(56) References Cited

U.S. PATENT DOCUMENTS

| | | | |
|---|---|---|---|
| 4,237,450 A | 12/1980 | Canez |
| 4,291,301 A | 9/1981 | Chan |
| 4,598,272 A | 7/1986 | Cox |
| 4,653,885 A | 3/1987 | Araki |
| 4,860,052 A | 8/1989 | Ito |
| 5,422,560 A | 6/1995 | Yan |
| 5,552,773 A | 9/1996 | Kuhnert |
| 5,801,629 A | 9/1998 | Lehmann |
| 5,894,275 A | 4/1999 | Swingle |
| 6,014,011 A | 1/2000 | DeFelice |
| 6,104,288 A | 8/2000 | Hopkins |
| 6,191,553 B1 | 2/2001 | Feng-Jung |

(Continued)

FOREIGN PATENT DOCUMENTS

| | | |
|---|---|---|
| CN | 2306575 | 2/1999 |
| CN | 2446708 | 9/2001 |

(Continued)

OTHER PUBLICATIONS

Carlton, "Good Thing Hotels Don't Charge for Left-Behind Chargers", The Wall Street Journal, Aug. 7, 2010, pp. A1-A2, New York, New York, US.

*Primary Examiner* — Jeffrey Hofsass
(74) *Attorney, Agent, or Firm* — Law Office of David J. Rosenblum

(57) ABSTRACT

A reminder system for a portable-device charger is designed for determining when it is likely that the charger is about to be left behind. Detection which may be in real time can pertain, depending on the embodiment, to disconnection of a portable device from the charger, and/or movement of a portable device out of wireless range of the charger or a charger adaptor. In some versions, the onset of reminding is, upon detecting disconnection, tentatively postponed until a predetermined criterion is met, such as expiry of a predetermined time period. Or the criterion can be detection of an out-of-range condition based on distance between the portable device and an adaptor or charger. In some embodiments detection and reminder issuance are incorporated in a unit, such as a plug-in wall adaptor or the charger itself. The adaptor can be generalized rather than specialized for a charger of a particular make or model. The system can be unobtrusive, and sensitive to the charger connection status, power saving and power outages.

72 Claims, 14 Drawing Sheets

U.S. PATENT DOCUMENTS

| | | |
|---|---|---|
| 6,255,958 B1 | 7/2001 | Haimovich |
| 6,265,976 B1 | 7/2001 | Roesner |
| 6,331,817 B1 | 12/2001 | Goldberg |
| 6,373,229 B1 | 4/2002 | Slusky |
| 6,428,334 B1 | 8/2002 | Skarie |
| 6,462,660 B1 | 10/2002 | Cannon |
| 6,493,550 B1 | 12/2002 | Raith |
| 6,535,120 B1 | 3/2003 | Sebanc |
| 6,545,446 B2 | 4/2003 | Isomichi |
| 6,577,239 B2 | 6/2003 | Jespersen |
| 6,614,350 B1 | 9/2003 | Lunsford |
| 6,624,752 B2 | 9/2003 | Klitsgaard |
| 6,882,866 B2 | 4/2005 | Sato |
| 7,013,163 B2 | 3/2006 | Jaggers |
| 7,042,360 B2 | 5/2006 | Light |
| 7,068,168 B2 | 6/2006 | Girshovich |
| 7,209,048 B1 | 4/2007 | Pace |
| 7,248,840 B2 | 7/2007 | Chien |
| 7,274,169 B2 | 9/2007 | Burgan |
| 7,736,033 B2 | 6/2010 | Patel |
| 7,751,852 B2 | 7/2010 | Kavounas |
| 2002/0094849 A1 | 7/2002 | Cannon et al. |
| 2002/0149502 A1 | 10/2002 | Goss |
| 2003/0085626 A1 | 5/2003 | Odaohhara |
| 2004/0119600 A1 | 6/2004 | Hampton |
| 2004/0230685 A1 | 11/2004 | Seligmann |
| 2005/0246094 A1 | 11/2005 | Moscatiello |
| 2006/0224319 A1 | 10/2006 | Rogers |
| 2006/0255918 A1 | 11/2006 | Bernstein |
| 2007/0096691 A1 | 5/2007 | Duncan |
| 2007/0298776 A1 | 12/2007 | Arlene |
| 2008/0007212 A1 | 1/2008 | Theytaz |
| 2008/0032650 A1 | 2/2008 | Zhang |
| 2009/0023481 A1 | 1/2009 | Foster |
| 2009/0082890 A1 | 3/2009 | Griffin, Jr. |
| 2009/0128090 A1 | 5/2009 | Bi |
| 2009/0128346 A1 | 5/2009 | Zhao |
| 2009/0235006 A1 | 9/2009 | Desrosiers |
| 2009/0251318 A1 | 10/2009 | Ho |
| 2010/0001684 A1 | 1/2010 | Eastlack |
| 2010/0225493 A1 | 9/2010 | Zishaan |
| 2010/0271206 A1 | 10/2010 | Blankestijn |

FOREIGN PATENT DOCUMENTS

| | | |
|---|---|---|
| CN | 2901665 | 5/2007 |
| CN | 2909660 | 6/2007 |
| EP | 0581416 | 2/1994 |
| EP | 1251472 | 10/2002 |
| FR | 2768227 | 3/1999 |
| GB | 2248331 | 4/1992 |
| GB | 2276479 | 9/1994 |
| GB | 2318671 | 4/1998 |
| GB | 2400959 | 10/2004 |
| GB | 2452024 | 2/2009 |
| JP | 11284701 | 10/1999 |
| WO | 03007257 | 1/2003 |
| WO | 2008001052 | 1/2008 |

BATTERY CHARGER LOSS PREVENTION ADAPTOR HAVING A NOTIFICATION MODULE

CROSS-REFERENCE TO RELATED APPLICATIONS

This application claims the benefit under 35 USC §119(e) of U.S. Provisional Patent Application No. 61/378,054, filed Aug. 30, 2010 by the present inventor.

FIELD OF THE INVENTION

The present invention relates to issuing reminders and more particularly, to issuing reminders with respect to a connection status.

BACKGROUND OF THE INVENTION

Travelers doing a last-minute scan of a room before checking out often leave behind portable-device battery chargers. They are easy to miss, due to their dark color and especially if the wall outlet is behind furniture. You can easily forget in the morning the charger you plugged in the night before for charging. This problem is exacerbated by the wide variety of mobile devices, each with its own charger that a traveler potentially has to keep track of.

Hotels typically have an abundant supply of left-behind chargers.

However, they do not contact the guest due to privacy concerns and the time and effort that would be involved. Also, the hotel often does not know the contact information if the reservation was made through online services.

Shipping the charger back to its owner still leaves the owner without a means for charging the device until the charger arrives, which could leave the device inoperative for several days.

Purchasing a new charger that is compatible with the device also could entail inconvenience and delay.

Most chargers, even when not charging the portable-device battery, consume electrical power, even though some electrically disconnect from the wall current, as described in U.S. Patent Publication No. 2010/0001684 to Eastlack (hereinafter "the Eastlack patent"), which is incorporated herein by reference in its entirety. Thus, forgetting chargers often wastes energy, until the charger is discovered and unplugged.

U.S. Pat. No. 6,373,229 to Slusky (hereinafter "the Slusky patent"), entitled "Battery Charging System for Portable Electronic Devices", which is incorporated herein by reference in its entirety, checks whether a battery is electrically connected to a charger. If it is not, Slusky generates an alarm reminding the user to charge the portable device.

Notably, the checking is at a particular time of day pre-set by the user for when charging is intended to commence, and the checking is for a current, existing connection regardless of when disconnection, if any, actually occurred. Accordingly, the Slusky device would not be effective in alerting the user that a charger is about to be left behind.

U.S. Patent Publication No. 2010/0225493 A1 to Zishaan, entitled "Improvement to Response Units," (hereinafter "Zishaan"), discloses a travel packing assisting system that, in connection with a user's change in location, issues a user warning signal specific to one or more articles to be packed. A detector detects when the article is in a travelling mode of use.

In a Zishaan embodiment comprising both a charger and a portable device chargeable by the charger, the detector detects, among other things, when the charger is separated from the portable device.

The device, such as a mobile phone, and the charger both have wireless transceivers, the device detecting the travelling mode. The device features a user interface for prompting the user with regard to travel plans and for entering scheduling information.

SUMMARY OF THE INVENTION

Systems for reminding, as to events or objects, often require the user to pre-arrange specific circumstances under which to be reminded, or particular times as with many personal digital assistants (PDAs).

Problematically, however, the particular times entered into the system may become ineffective if travel plans change, and the user bears the burden of keeping track of this. There also is the tendency to issue too many "false positives", i.e., reminders that the user may find obtrusive and unnecessary.

Reminder systems for mobile or portable electronic devices chargeable by a charger are available, relying on wireless detection by a device worn or carried by the user that the object to be protected is too far away.

These protocols are not sufficiently targeted for reminding a user about to leave behind a charger.

In this regard, much more often than not, the left-behind charger is still plugged in to the wall outlet, and the device it was charging has been removed; thus, firstly, if it is not plugged in, it is not as likely to be left behind, and whether a reminder is necessary or desired is in doubt.

Yet, in many existing systems, the reminder issues whether or not the object, i.e., portable electronic device typically having a battery, is currently plugged in for charging.

Secondly, at least since electronic devices in general are not connected for charging other devices, reminders are issued without taking into account this connection status either. In the case of a charger, however, travelers rarely leave it behind still attached to the device being charged. Therefore, a reminder is not needed in this case, either.

With regard to false alarms, they can often occur just when the traveler is in a hurry to get somewhere.

Alternatively, travelers may become de-sensitized to the alarms. If a reminder issues every time the guest leaves the hotel to go to breakfast, lunch, dinner, a business meeting, or a social occasion, the guest might as a consequence ignore the true notification he or she received, upon checking out, that would otherwise have caused the guest to go back for the portable electronic device.

The same problem of false alarm problem would exist for a charger.

The Zishaan application, discussed above, discloses a travel packing assisting system that includes measures to prevent a charger from being left behind, but fails to specifically address several of the issues that relate to a charger in particular.

Although the above-mentioned Zishaan embodiment, for example, detects separation of a charger from the portable device, Zishaan fails to disclose or suggest taking into account, before commencing a reminder, whether the charger is plugged in to the wall outlet. Nor is there any "grace period" offered in which the user can restore the device to "plugged-in" status and thereby avoid the alarm. It would be desirable to give the user leeway, such as a grace period of predetermined length, in which to plug, unplug and move around devices without being interrupted by a signal serving as a reminder, e.g., by means of an alarm, incoming-message audible tone, or screen prompt.

There is also the problem, mentioned above, that changes to the traveler's schedule require, as in Zishaan, constant attention so that entered parameters are accordingly updated. It may be harder for a traveler to keep up with the changes than it would be to remember the charger unassisted.

Additionally, relying on a personal digital assistant (PDA), or PDA-like capability, for scheduling and for tracking the user's movement, as in Zishaan, can burden the traveler with yet one more portable device if, for example, a separate mobile phone is used.

It is noted too that the user in Zishaan must acquire the software application affording the user interface on the PDA or PDA-like portable device.

Also, each charger, if dedicated, must separately be provided with the wireless communication and alarm capability.

What is needed is a protocol that is convenient, automatic and selectively unobtrusive. It should, for example, forego reminding when the user is about to leave to go somewhere at a time when the charger is charging a portable device. Yet, the device or method should be effective in promptly reminding the traveling user who is about to leave a charger behind under conditions in which loss of the charger is potentially imminent. Optionally, the device or method could be sensitive to the need for a reminder, and the level of obtrusiveness, in the event of a power outage and the events that thereafter transpire. The device or method could also delay issuance of the reminder, in case the user is merely plugging, unplugging or moving devices without any intention of leaving at that time. The device and method might further seek to conserve energy when the charger is plugged in but not charging, and be adaptive to chargers that themselves incorporate such an energy-saving function. In addition, the device or method may be generalized rather than specialized for use with a particular type of portable-device plug-in charger.

The present invention is directed to addressing one or more of the above-noted shortcomings to the prior art.

In accordance with an aspect of the present invention, a unit is connectable for charging a portable device and configured to prevent leaving behind a portable-device battery charger when a battery chargeable by the charger is disconnected from the charger. The unit includes a detector configured for detecting the disconnection. It further includes a notification module configured for, responsive to detection of the battery being disconnected from the charger and to prevent the leaving behind, issuing a reminder.

In accordance with another aspect, a portable-device battery charger is configured to prevent itself from being left behind when a battery of a portable device is disconnected from the charger. The charger is configured for, responsive to the charger detecting the disconnection from the charger and to prevent the leaving behind, issuing a reminder. The charger independently detects the disconnection.

According to a further aspect, an adaptor is connectable directly to an electrical outlet and configured to prevent leaving behind a portable-device battery charger when a portable-device battery is disconnected from the charger. The adaptor includes a notification module configured for, responsive to detection of the battery being disconnected from the charger and to prevent the leaving behind, issuing a reminder.

According to yet another aspect, a unit configured for preventing a battery charger from being left behind is configured for supplying power from an electrical outlet to a portable device connected for charging. The unit is also configured for, responsive to breaking of the connection, delaying commencement of reminding a user.

According to one other aspect, circuitry for preventing a battery charger from being left behind includes a portable-device disconnection detector configured for detecting a disconnection event in which a portable device is disconnected from a battery charger. The detection of the event occurs in real time. The circuitry includes a notification module configured for, responsive to the disconnection event, delaying commencement of reminding a user.

In accordance with a different aspect, a method for making a unit connectable for charging a portable device and configured to prevent leaving behind a portable-device battery charger when a battery of the device is disconnected from the charger, includes configuring the unit so as to incorporate a notification module for issuing a reminder to thereby prevent the leaving behind. The issuing is responsive to detection, by the unit, of the battery being disconnected from the charger.

In a yet further aspect, an adaptor includes an engagement detector configured for detecting, based on, at least one of a) a location of a first adaptor surface that faces a surface of an electrical outlet with respect to the outlet surface and b) a location of a surface, of a battery charger, that faces a second adaptor surface with respect to the second adaptor surface, whether, correspondingly, the outlet or the charger is connected to the adaptor. The adaptor further includes a notification module configured for, correspondingly responsive to the detecting that the outlet or the charger is so connected, issuing a reminder.

In accordance with yet another aspect, a unit for preventing a charger from being left behind includes a detector configured for detecting, by wireless communication, movement of a portable device that meets a predetermined criterion based on a distance between the detector and the device. It also includes a notification module configured for, responsive to the meeting of the criterion, issuing a reminder to thereby prevent the leaving behind. The unit further includes a switch by which the module is switchable by a user into a state that is inactive but allows said unit to still provide power for charging a portable device, and by which the module is switchable back into an active state. The unit is designed for the issuing only if the unit is connected for receiving electrical power from an electrical outlet.

In accordance with a related aspect, a unit for preventing a charger from being left behind includes a detector configured for detecting, by wireless communication, movement of a portable device that meets a predetermined criterion. The criterion is based on a distance between the detector and the device. It further includes a notification module configured for, responsive to the meeting of said criterion, issuing a reminder to thereby prevent the leaving behind. The unit is configured for detecting whether it is connected for receiving power from an electrical outlet. The issuing is responsive to a result of the detecting whether the unit is connected.

In accordance with one other related aspect, a unit is configured for preventing a charger from being left behind. The unit comprises a detector configured for detecting, by wireless communication, movement of a portable device that meets a predetermined criterion. The criterion is based on a distance between the detector and the device. The unit further comprises a notification module configured for, responsive to the meeting of the criterion, issuing a reminder to thereby prevent the leaving behind. The unit is further configured for detecting whether it is connected, to a portable device, for supplying a portable-device battery with power from an electrical outlet. The issuing is responsive to a result of the detecting whether the unit is connected.

In accordance with one further related aspect, a unit includes a detector configured for detecting, by wireless communication, movement of a portable device that meets a predetermined criterion. The criterion is based on a distance between the detector and the device. The unit also includes a notification module configured for, responsive to the meeting of the criterion, issuing a reminder. The issuing is subject to detection of disconnection, from a charger, of a portable-device battery.

In accordance with another related aspect, a unit configured for preventing a charger from being left behind includes a detector configured for detecting, by wireless communication, movement of a portable device that meets a predetermined criterion. The criterion is based on a predetermined distance between the detector and the device. The unit also includes a notification module configured for, responsive to the meeting of the criterion, issuing a reminder to thereby prevent the leaving behind; and a battery for supplying power to the unit. The unit is designed for the issuing only if the unit is connected for receiving electrical power from an electrical outlet.

According to yet another related aspect, a unit configured for preventing a charger from being left behind comprises a detector configured for detecting, by wireless communication, movement of a portable device that meets a predetermined criterion. The criterion is based on a distance between the detector and the device. It further comprises a notification module configured for, responsive to the meeting of said criterion, issuing a reminder to thereby prevent the leaving behind. The unit is designed for the issuing only if the unit is connected for receiving electrical power from an electrical outlet. The unit is configured for the issuing even when the unit is not receiving the power from the outlet.

According to one more version of the invention, a wall outlet adaptor is configured for, while a device remains plugged in to the adaptor, sensing, from the device, that the device is about to be left behind.

Details of the novel charger adaptor and the charger loss prevention method are set forth further below, with the aid of the following drawings, which are not drawn to scale.

DETAILED DESCRIPTION OF EMBODIMENTS

Figure 1:
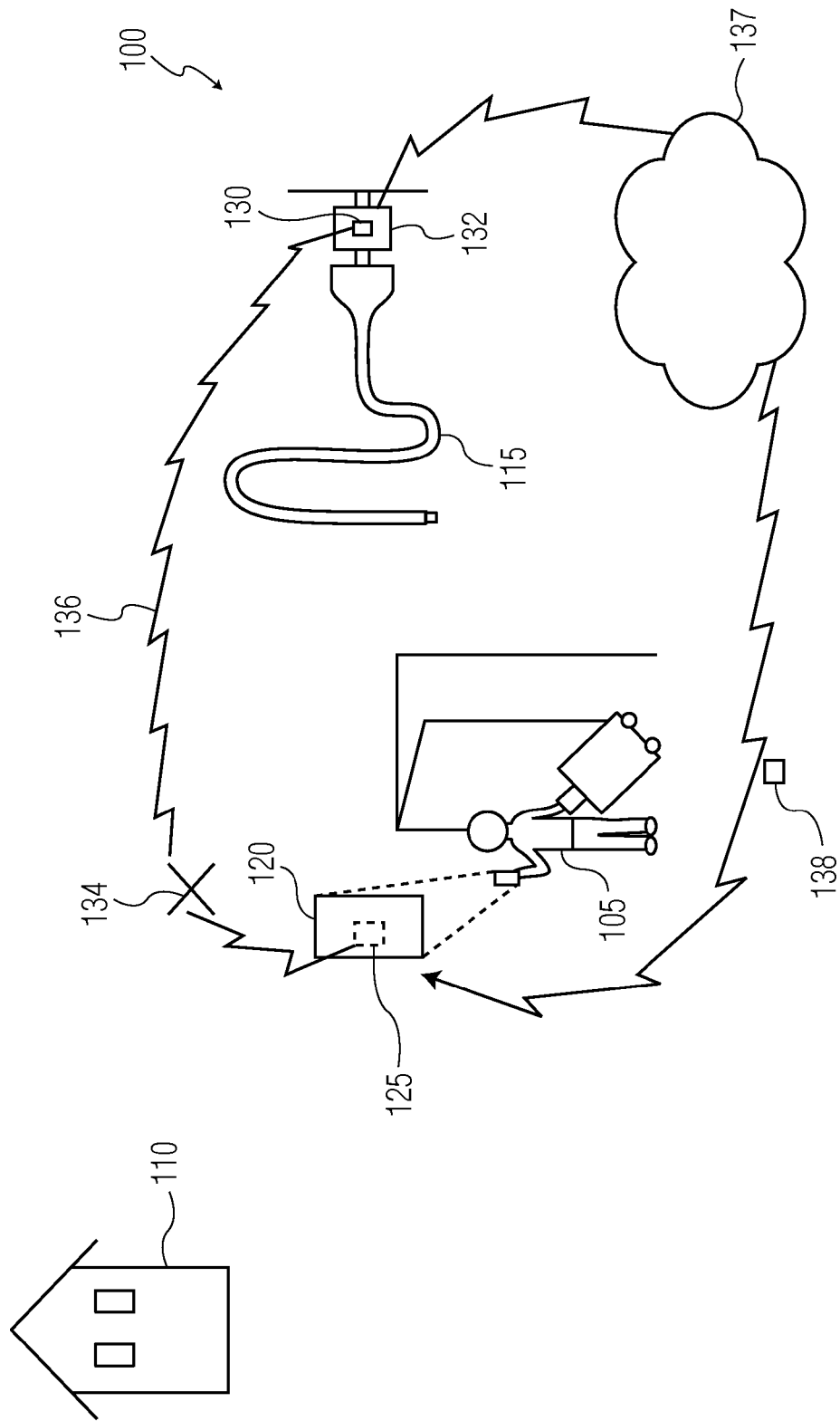
FIG. 1 is a conceptual diagram providing an overview of an exemplary first embodiment, in accordance with the invention.

FIG. 1 shows an example of a first embodiment 100 that involves wireless detection. A traveler 105 or user of a charger loss prevention system, away from home 110 is exiting a doorway and is about to leave behind a portable-device-battery charger 115. The charger 115 may have been charging the mobile or portable phone 120, shown in expanded view, or may have been charging any other portable appliance, such as a laptop, personal digital assistant (PDA), printer, email communicator, pager, camera, camcorder, electric toothbrush, etc. While exiting, the user has just brought the Bluetooth™ (hereinafter "BT") transceiver 125 in the phone 120 out of transmission range of the BT transceiver 130 residing in an adaptor 132 shown as mechanically and electrically connected to the charger 115. One end of the adaptor 132 is for receiving the plug of the charger 115. The other end is for plugging into the wall.

The adaptor 132 senses movement of a portable device or portable electronic device, here the phone 120 or other handheld device, away from the adaptor. In effect, it senses the potential for a user to inadvertently leave a charger behind. Specifically, it senses the transition to the out-of-range condition 134 or breaking of a wireless connection 136 symbolized in FIG. 1 by an "X." A detector within the adaptor 132 is configured for monitoring to detect, by wireless communication, movement of a portable device out of a predetermined range. More specifically, the out-of-range condition begins when the distance between the two transceivers 125, 130 exceeds a predetermined threshold representative of the transmission range.

Responsive to the onset of the out-of-range condition, the adaptor 132 sends a text message reminder 138 to the phone 120 in a wireless transmission over a network 137. The text message 138 pertains to the charger 115 and adaptor 132 both about to be left behind, as in "take the charger", or the adaptor about to be left behind, as appropriate. The text message reminder 138 is typically preceded by an audible signal, or a vibration if the phone is in vibration mode, which indicates that a text message has arrived. Alternatively, the reminder can be in any other form, such as tactile.

Responsive to the out-of-range condition, the system can also detect that the adaptor 132 alone is about to be left behind.

Figure 2A:
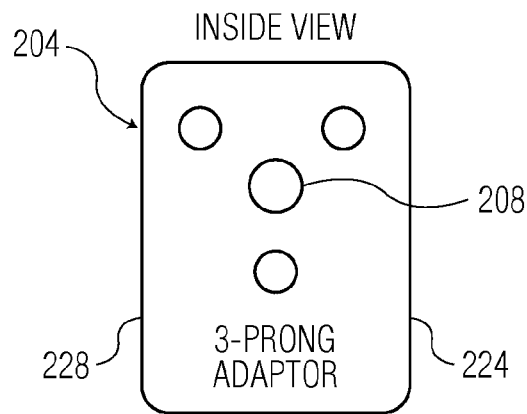
FIG. 2A-2C is an exemplary schematic diagram of an adaptor and its connections.
Figure 2B:
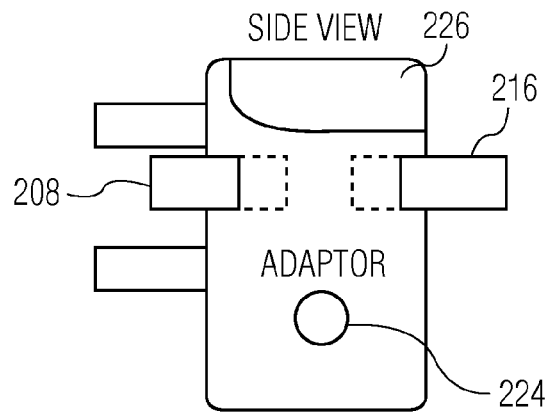
Figure 2C:
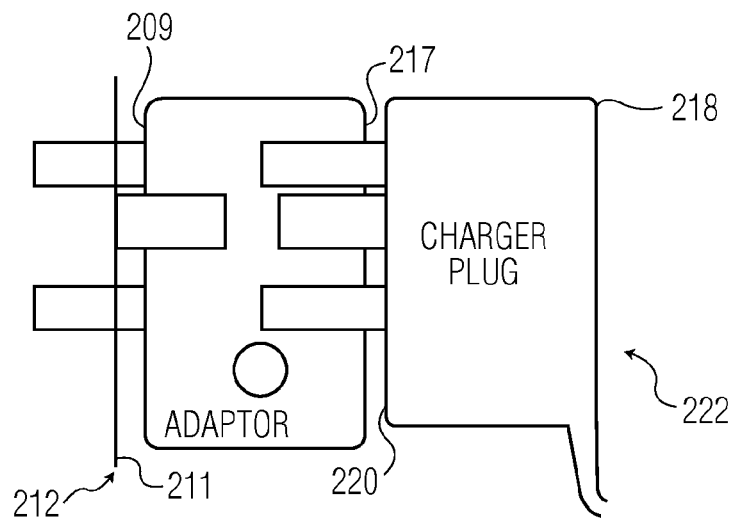

A particular configuration for a charger loss prevention adaptor 204 is shown in FIGS. 2A-2C although many variations are possible.

The three-prong adaptor 204 is connectable directly to an electrical outlet, such as a wall outlet of a hotel room, serving as a source of electrical power. The adaptor 204 has, as shown in the inside view of FIG. 2A, a resilient adaptor-connection toggle button 208. The adaptor-connection toggle button 208 protrudes, as best seen from FIGS. 2B, 2C, from a first adaptor surface 209. The button 208 is urged in by an electrical outlet surface 211, against spring-loaded pressure, when the adaptor 204 is plugged in to the outlet. Specifically, the wall outlet face 212 forces the button 208 in. Unplugging the adaptor 204 automatically releases the button 208 to assume its original position. The adaptor 204, in some implementations, has a backup battery to allow it to operate after being unplugged. The adaptor 204 can sense from the state of the button 208 whether it is plugged in. As an alternative, two high-resistance resistors within the adaptor 204 can, in series, be placed in parallel with the load. From the voltage detected between the resistors, it can be determined whether the adaptor 204 is plugged in. Making the resistance extremely high minimizes the power consumption by the resistors.

A resilient charger-connection toggle button 216 protrudes from a second adaptor surface 217, and is configured and operates analogously with respect to urging pressure from a charger plug 218, i.e., from a surface 220 of a battery charger 222.

The adaptor 204 can likewise ascertain whether it is connected to the charger 222 from the detected "in" or "out" state of the charger-connection toggle button 216. The connection status of the charger 222, when the adaptor 204 is plugged into the wall outlet, may alternatively be obtained based on measuring current flow. Current may be drawn for charging a portable device and/or may be drawn by a battery-present indicator in the charger, such as a light-emitting diode (LED) 226 that lights up when the battery is placed in or connected to the charger. If, on the other hand, no device is connected for charging, i.e., in a "no-load" condition, there generally will still be a small current to the transformer. In either case, the current can be measured by means of a low-resistance, series resistor, if the charger 222, like most, is not designed to shut down power when there is no load or a fully-charged load. An example of a charger with the shutdown capability is provided in the Eastlack patent. As discussed herein below, the adaptor 204 can also be equipped to perform a power-saving shutdown. An alternative to the low-resistance, series resistor is a hall probe current sensor.

A home/travel mode switch 224 allows the user 105 to put the adaptor 204 in "home mode" which inactivates the reminding function, exemplified in FIG. 1 in the form of a text message reminder. At home, the user 105 may want to leave the charger 222 in the wall. Accordingly, the adaptor 204 need not physically be disconnected from the charger 222 to use the charger at home. In fact, the power-saving shutdown feature can advantageously be utilized. Alternatively, the adaptor 204 may be implemented without any electrical power regulating function.

The power-saving shutdown feature automatically shuts down the alternating current (AC), a capability that, as mentioned herein above, some chargers have. Without the AC, the charger loss prevention circuitry, or "system", cannot detect whether the user 105 has unplugged the portable device plugged in for charging. Therefore, as a precaution, the light-emitting diode (LED) 226 on the adaptor 204 flashes continually to warn the user 105. Since the power-saving shutdown may occur overnight, a less obtrusive flashing LED is preferred over an audible signal. Even though unplugging the portable device, if it occurs, is not detected, on account of the absence of AC, the adaptor 204 can, by means of backup circuitry, detect when the user is starting to leave, e.g., in the morning, and send the text message reminder 138. Thus, issuing of the reminder 138 can occur even when the adaptor 204 is not receiving power from an electrical outlet.

AC can be restored when the user 105 presses a post-power-saving reactivation switch 228. This also halts the flashing.

Figure 3:
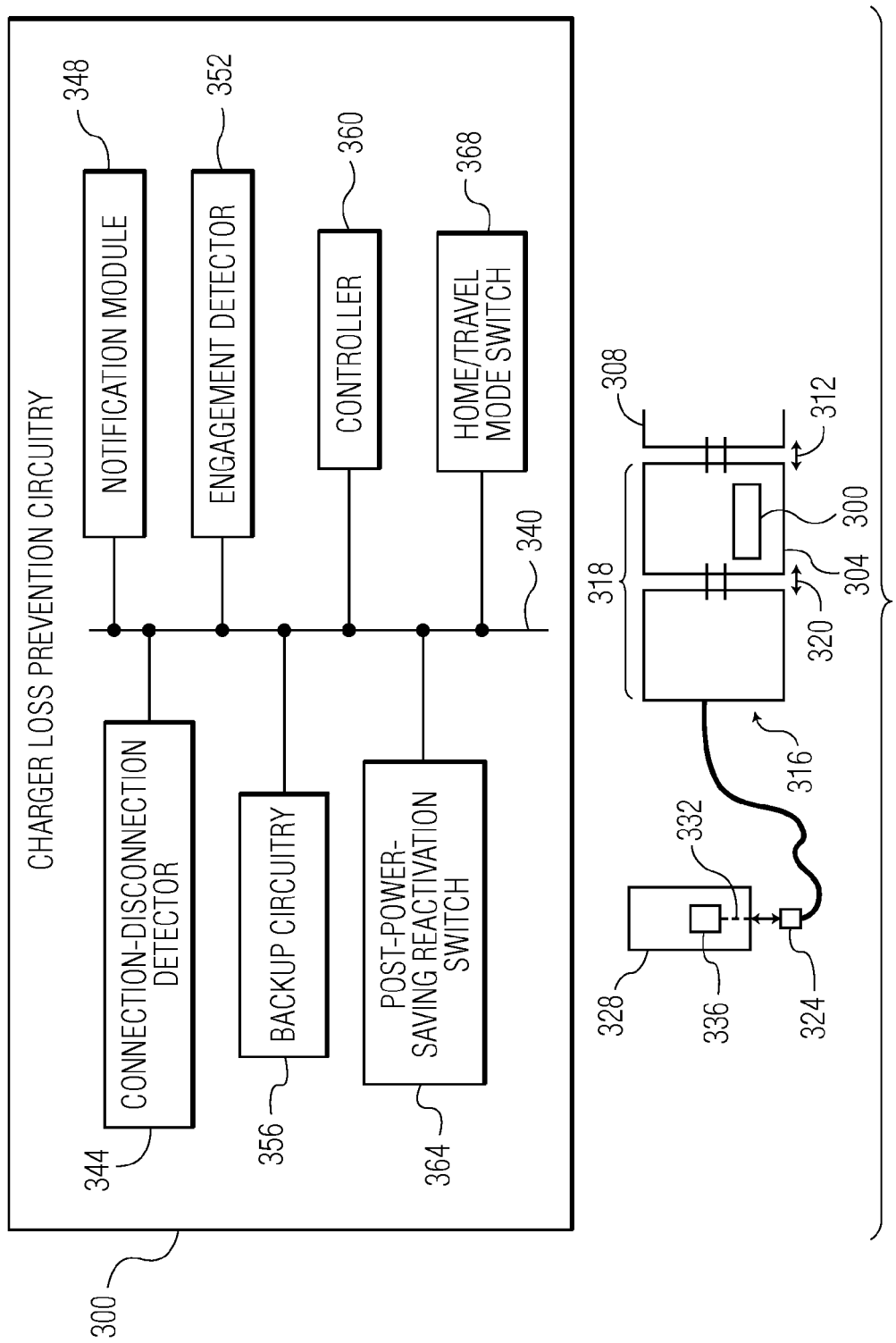
FIG. 3 is an exemplary schematic diagram of further connections to the adaptor and of the first embodiment.

FIG. 3 depicts, by way of illustrative and non-limitative example, an overview of charger loss prevention circuitry 300 in accordance with the first embodiment of the present invention. The circuitry 300 is designed primarily, as discussed herein above, for preventing a user who is currently away from home from leaving a charger behind in a wall outlet. The circuitry 300 can be implemented as, for example, analog electronic components, a hybrid circuit, or a solid state device comprising an integrated circuit which includes any form of RAM, ROM, ASIC, PLD, or combination thereof, and can be implemented in software, firmware or hardware or any combination thereof.

The circuitry 300 can be incorporated into a plug-in unit, separate from a portable device to be charged, and implemented for example as an adaptor 304 for making a plug-in connection to an outlet. The adaptor 304 is depicted in FIG. 3 as detachably pluggable into a wall outlet 308, as indicated by the arrows 312, and can detachably receive a charger 316 to which it is removably connectable, as shown by the arrows 320.

The charger 316 has an end 324 which detachably is connectable to a separate, portable device 328, such as a personal digital assistant (PDA). By the detachable connection, an electrical connection 332 is established to a portable-device-battery 336 chargeable by the charger 316 and configured for powering the portable device 328. Disconnection of the battery 336 from the portable-device battery charger 316 occurs by detachment, from the charger, of the portable device 328 to which the battery is attached. The portable device 328 can be any portable, mobile or handheld device, or it can be a battery. Disconnection of the portable device 328 electrically disconnects the battery 336 from the charger 316.

In some versions of the invention, the adaptor, including its circuitry 300, can be integrated 318 with the charger 316 to form a single unit. In the case of an integrated charger, disconnection can be detected directly by the charger in any known and suitable manner, as described for example in U.S. Pat. No. 6,014,011 to DeFelice et al. As in the case of a charger and separate adaptor, the integrated charger, responsive to detecting disconnection of the portable device 328, issues the reminder 138 to thereby prevent itself from being left behind.

The charger loss prevention circuitry 300 includes, attached to a data and control bus 340, a connection-disconnection detector 344, a notification module 348, an engagement detector 352, backup circuitry 356 including a backup battery (not shown), a controller 360, a post-power-saving reactivation switch 364, and a home/travel mode switch 368.

Figure 4:
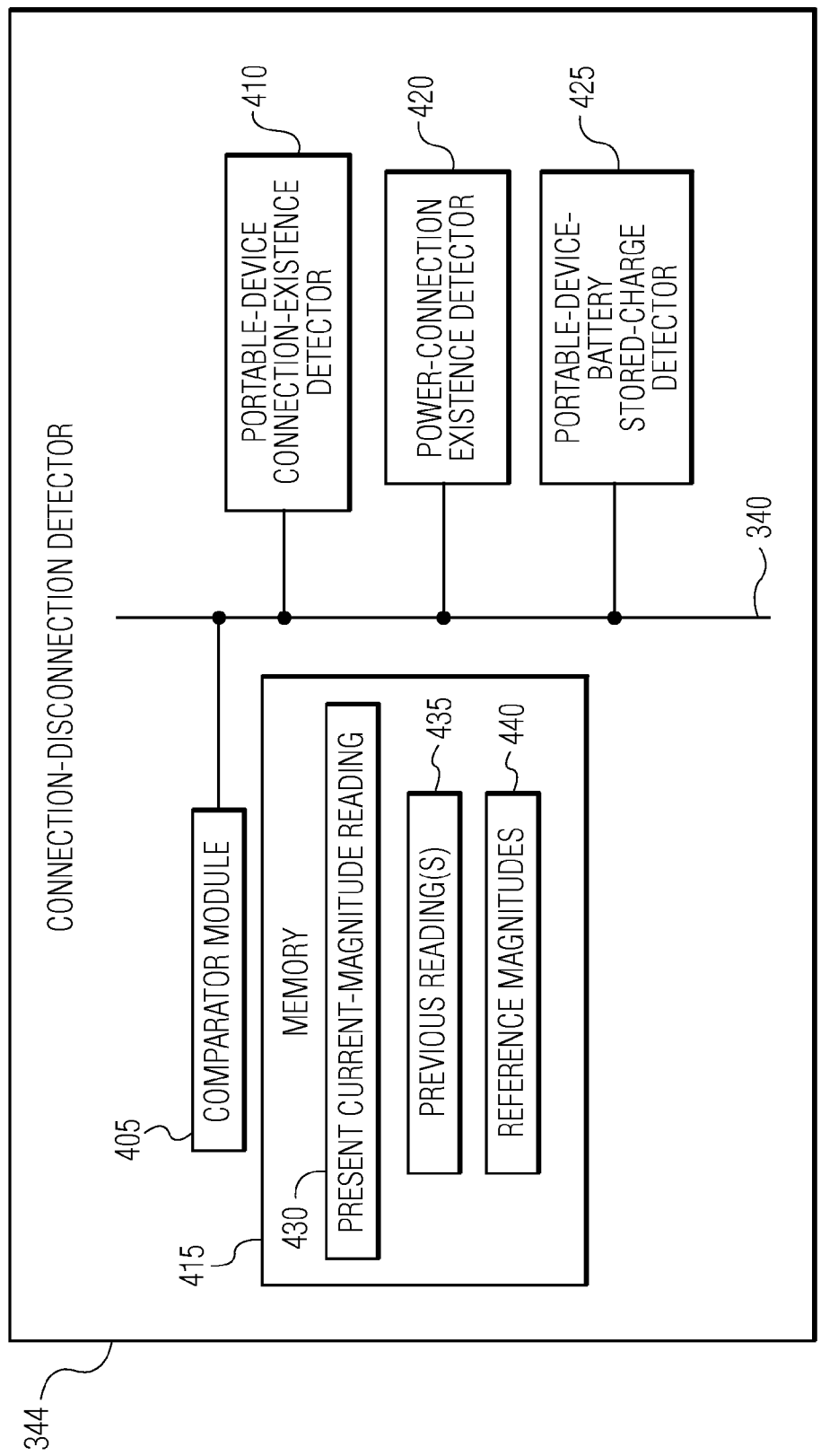
FIG. 4 is an exemplary schematic diagram of the connection-disconnection detector of the first embodiment.

One variation of the connection-disconnection detector 344, as shown in FIG. 4, includes, attached to the data and control bus 340, a comparator module 405, a portable-device connection-existence detector 410, a memory 415, a power-connection existence detector 420, and portable-device-battery stored-charge detector 425.

The memory 415 can store a present current-magnitude reading 430, one or more previous readings 435 and reference magnitudes 440. It further can comprise working storage and storage for data and control information (not shown).

Figure 5:
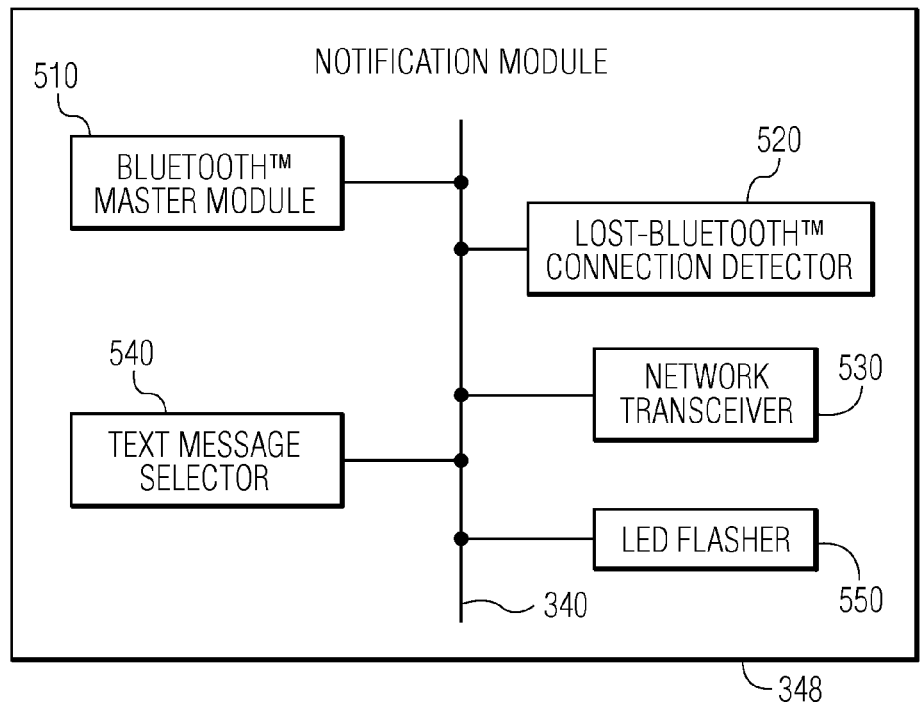
FIG. 5 is an exemplary schematic diagram of the notification module of the first embodiment.

The notification module 348 of the current example, as shown in FIG. 5, includes, attached to the data and control bus 340, a Bluetooth™ module 510 serving as a master, a lost BT connection detector 520, a network transceiver 530, a text message selector 540 and an LED flasher 550.

Figure 6:
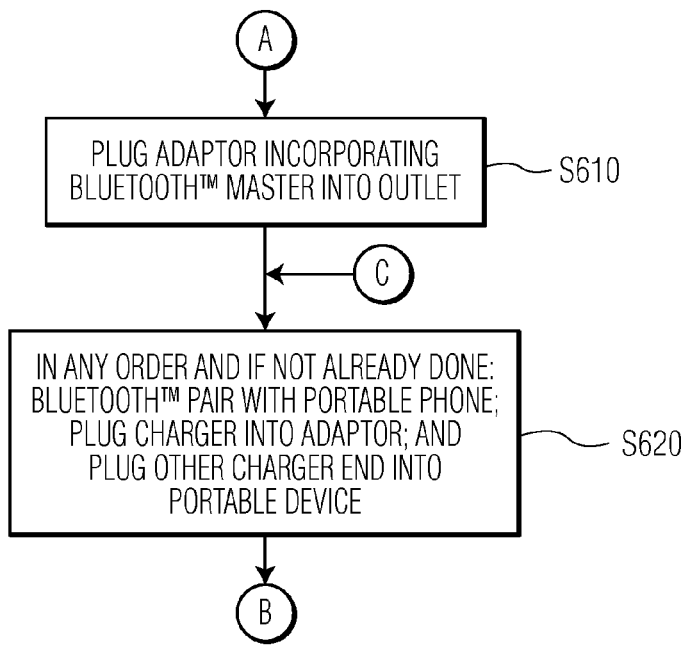
FIGS. 6-7 and 8A-8C are, collectively, flow charts illustrating, by example, operation of the first embodiment.

In operation, according to one scenario, and as seen in FIG. 6, the user connects together, in any order, the components, i.e., the adaptor 304, the charger 316, and the portable device 328; with the adaptor, at some point, being plugged in to the wall outlet 308.

Once the adaptor 304 is plugged in (step S610), the user 105 can BT pair it with the phone 120. An initial BT Passkey is provided with the adaptor 304. The BT module 510 of the plugged in adaptor 304 prompts for the Passkey, as seen on a display screen of the phone 120 in BT transmission range of the adaptor. BT power class 2 has a range of about 10 meters. The user 105 enters the Passkey provided and the BT module 510 then pairs with the BT transceiver 125 of the phone 120. The BT module 510 then causes the paired phone 120 to send it a text message. The adaptor 304 gets the phone number from the received message, and stores the phone number for later use as a destination. In particular, the adaptor 304 can, at that later time by means of the network transceiver 530, text the user 105 a reminder selected by the text message selector 540. The network transceiver 530 incorporates the message transmit functionality of a two-way pager. Accordingly, in step S620 and in any order and if not already done, the adaptor 304 is BT paired with the portable phone 120; the charger 316 is plugged into the adaptor; and the other charger end 324 is plugged into the portable device 328.

Once the BT pair is formed and it is detected, as by the engagement detector 352, by means of the buttons 208, 216, that the charger 316 and the adaptor 304 are plugged in (step S620), the lost-Bluetooth™-connection detector 520 which is in the adaptor 304 monitors for the phone 120 being out of BT range, i.e., when the wireless, BT connection 136 to the phone no longer exists (S710). Although the portable phone 120 would typically independently become aware of the out-of-range condition, the system 300 need not rely on this and does not include the phone. In the event of an out-of-range condition, the BT paired connection is broken, and the user 105 will be re-prompted, if and when the phone 120 is brought in-range. At that point, the user 105 can easily re-pair the phone 120 with the adaptor 304.

Figure 8A:
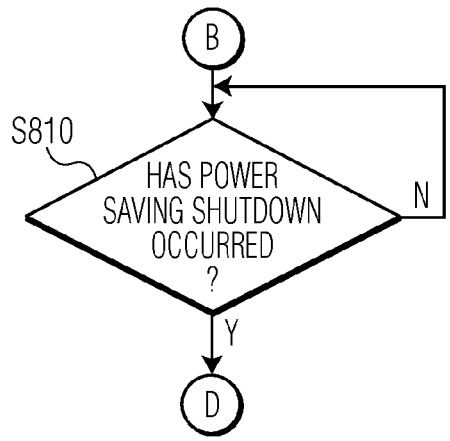

Simultaneous with the monitoring for movement out-of-range (step S710), the circuitry 300 monitors, as seen in FIG. 8A, for the occurrence of a power-saving shutdown by the charger. Or the circuitry 300 potentially decides to execute the shutdown itself based on a "no-load" condition when a charger alone is connected. The "no load" condition is detectable by comparison of the present current-magnitude reading 430 with the respective reference magnitude 440. The self-initiated shutdown, shutting off power to the charger 316, can also occur in reaction to a full-charge condition detected by the portable-device-battery stored-charge detector (step S810). The self-initiated shutdown in either case and in an exemplary implementation, uses a relay whose normally-closed armature opens, by electromagnetic attraction and against pulling force of a spring, thereby interrupting a path through which the AC flows to the load. The opening pulls the armature into magnetic engagement with a fixed contact, keeping the armature open. Actuation of the post-power-saving reactivation switch 364 mechanically forces the armature out of the magnetic engagement, the pulling force of the spring thereby closing the AC electrical path. Although the shutdown state, whether self-initiated or not, does prevent detection of whether the portable device 328 is connected for charging, it does not hamper the ability to tell at a later time, i.e., when the user 105 leaves, whether the charger itself is connected. In particular, this first embodiment has the backup circuitry 356, and the engagement detector 352 equipped to detect an "in" state of the resilient charger-connection toggle button 216. Although the engagement detector 352 is described hereinabove as operable by the mechanical urging in or release of a button 208, 216, the intended scope of the invention is not so limited. The engagement detector 352 may, in a broader context, instead be designed to respond to connection of the adaptor 204 and of the charger plug 218, or the charger alone in the integrated version, whether or not the connection, for example, relies on prongs or is electromagnetic as in the case of induction. The connection may be detected based, respectively, on a location of an electrical outlet surface 232 with respect to a first adaptor surface 236 and on a location of the battery charger surface 220 with respect to a second adaptor surface 240. Also, although the adaptor 204 is illustrated in FIG. 2 as a stand-alone device, it may be made appurtenant to a wall outlet. This can involve a hinge that rotates the adaptor either above the outlet and thereby out of engagement, or down into engagement. Instead of a hinge, a track can be provided that allows the adaptor to be slid into and out of engagement.

Figure 7:
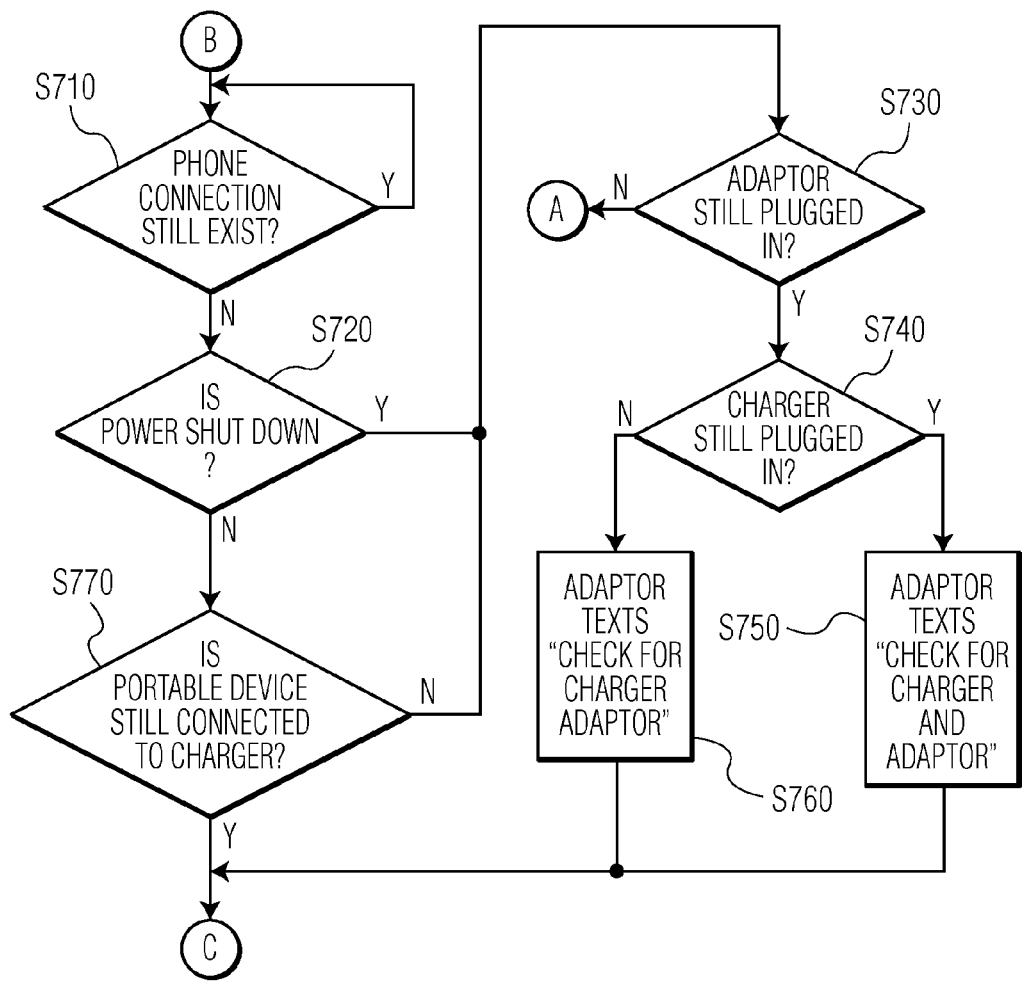

Returning to FIG. 7, once the lost-Bluetooth™-connection detector 520 detects that a hybrid connection no longer exists (step S710), on account of the wireless connection 136 being broken when the phone BT transceiver 125 is carried out of range, the processing branches, based on whether the power is shut down (step S720). If the power is shut down, this may have occurred because of a self-initiated or externally-imposed power-saving shutdown as described immediately above. Or, the shutdown may be as a result of a power outage. In any event, if the power is shut down, query is made as to whether the adaptor 304 is still plugged in, i.e., whether the adaptor in a state of being connected for powering from the electrical outlet 308 (step S730). The engagement detector 352 can determine whether the adaptor 304 is plugged in, by the "in" or "out" state of the resilient adaptor-connection toggle button 208. If the adaptor 204 is not plugged in, there is no need to send a reminder, and processing returns to step S610. If, on the other hand, the adaptor 204 is plugged in, although it is not known, on account of the absence of AC power, whether the portable device 328 is also plugged in, it is assumed, based on the detected "out-of-range" status, that the user 105 is leaving. Therefore, as a precaution, the text message reminder 138 is sent out. If the charger 316 is still plugged in (step S740), the text message selector 540 selects, and BT master module 510 texts, by way of the network transceiver 530, "check for charger and adaptor" (step S750). If, on the other hand, the charger 316 is not still plugged in, the text message selector 540 selects, and the BT master module 510 texts, by way of the network transceiver 530, "check for charger adaptor" (step S760). Optionally, however, the latter message can be foregone, i.e., the issuing of the reminder 138 can be subject to the charger 316 being in a state of being connected for powering from the outlet 308. At this point, whatever the reminder 138, if any, that is issued, processing then returns to step S620. Looking now again at step S720, if power is not shut down, then whether the portable device 328 is connected is known or can be determined. Therefore, based on the "in" or "out" state of the adaptor-connection and charger-connection buttons 208, 216, the determination on whether the user 105 needs to be notified can more reliably be made. Accordingly, if power is not shut down, the portable-device connection-existence detector 410 determines whether the portable device 328 is connected to the charger (step S770). Since the portable device 328 was connected to the charger 316 in step S620, step S770 detects disconnection of the portable device from the charger. In particular, the comparator module 405 compares the present current-magnitude reading 430 with the reference magnitude 440 that indicates a minimum current level for charging a portable device. If the portable device 328 is connected, there is no need to notify the user 105, and processing returns to step S620. If, on the other hand, it is not connected, processing follows the afore-described logic starting with step S730, albeit with more certainty of the need for notification if, by means of the engagement detector 352, it is detected that the charger 316 or the adaptor 204 is plugged in.

Figure 8B:
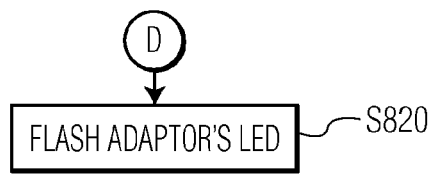

Meanwhile, starting with the monitoring for a lost wireless connection, and returning to FIG. 8A, if a power saving shutdown occurs (step S810), the LED flasher 550 starts, as seen from FIG. 8B, flashing the LED 226 (step S820). In effect, at this moment, an audible component of the reminder 138 is suppressed. Also, monitoring begins for actuation, i.e., pressing, of the post-power-saving reactivation switch 364 (step S830).

If the shutdown is due to a power outage, the LED 226 is not flashed. After all, there is no indication here that the user 105 is leaving, the outage may be temporary, and power may be restored by the time it is detected that the user is leaving. If power is restored by that time, a definitive determination can, at that time, be made in step S770 as to whether the portable device 328 is disconnected. Thus, a reliable decision can be made on whether to, at that time, issue a reminder. In effect, rather than issuing a potentially pre-mature reminder now, the circuitry 300 defers the decision to that time, on whether to issue a reminder.

Another possibility is that the shutdown is an externally-imposed power-saving shutdown, i.e., one imposed by the charger 316 for example. The externally-imposed power-saving shutdown can occur due to a fully-charged battery or due to a "no-load" power-saving shutdown, as when an unconnected charger having that capability is left in the plugged-in adaptor 204.

If, accordingly, the shutdown is due to an externally-imposed power-saving shutdown, there exists the real possibility of the user leaving at a time when it still cannot be detected whether the portable device 328 is connected. Therefore, as a precaution, a reminder is issued. And as a further precaution, the reminder is commenced now, albeit in an unobtrusive form, such as flashing the LED 226.

It is therefore desirable to now distinguish occurrence of a power outage from occurrence of an externally-imposed power-saving shutdown.

The portable-device connection-existence detector 410 makes the distinction, based on the size of the drop off, the amount of current flow just prior to drop off, and the current flow change over time leading up to the drop off. See the Eastlack patent, FIG. 7. The comparator module 405 can, for example, compare the most-recent present current-magnitude reading 430 with the reference magnitude 440 that indicates a minimum current level for charging a portable device. Also, the portable-device-battery stored-charge detector 425 may make one or more comparisons to determine an extent to which the portable-device battery 336 is charged, i.e., a charging state of the battery. The comparisons are between the most-recent present current-magnitude reading 430 and, respectively, one or more of the previous readings 435 made periodically on an ongoing basis. A sufficiently-large abrupt transition down of current magnitude, particularly if it occurs from a high current magnitude, indicates a power outage. A power saving shutdown due to a fully charged battery, on the other hand, is often preceded by a slow or gradual drop off in current flow, the drop off being from a relatively lower current flow magnitude. In the case of an externally-initiated "no-load" power-saving shutdown, the last detected current magnitude would likewise typically be at a lower level. A power outage would therefore be recognizable.

Alternatively, the adaptor 204 may be implemented with the aforementioned pair of high-resistance series resistors placed in parallel with the load, lack of voltage between the pair indicating that the power is out.

All of the reference magnitudes 440 may be empirically derived so that the above-discussed distinctions can reliably be made based on the current-magnitude readings 430, 435.

Pressing the switch 364 causes, as described herein above, the LED flasher 550 to halt the flashing (step S840), and restores power-providing functionality for the adaptor.

Alternatively, the adaptor 204 may be designed such that merely unplugging it terminates the reminder. The reminder may be a continual or periodic reminder such as one that flashes, or a continuous reminder as from a horn or other device for communicating the reminder to the user 105. The unplugging and/or subsequent plugging can also serve to restore power-providing functionality of the adaptor 204 if the functionality has been disabled. However, at least the restoring function may be made dependent on a required actuation of the switch 364. This provides a more reliable indication, for safety sake, of the user's intention that the adaptor's power delivery capability be restored and the user's implicit acknowledgment that that is what is occurring.

If the power-connection existence detector 420 detects that the adaptor 204 is plugged in (step S850), processing returns to step S620. Otherwise, if it is detected that the adaptor 204 is not plugged in or otherwise connected for supplying a portable-device battery with power from the outlet 308, processing returns to step S610.

Deferring a reminder in the event of a power outage is an optional feature, and the circuitry 330 can be made to issue the reminder, such as the flashing LED of step S820, immediately even in the event of a power outage.

By means of the home/travel switch 368, discussed briefly herein above in connection with FIG. 2, the notification module 348 is switchable by the user 105 into a state that is inactive but allows the adaptor 304 to still convey power from the source 308 to the charger 316. The switch 368 likewise is used to switch the module 348 back into an active state.

Figure 9:
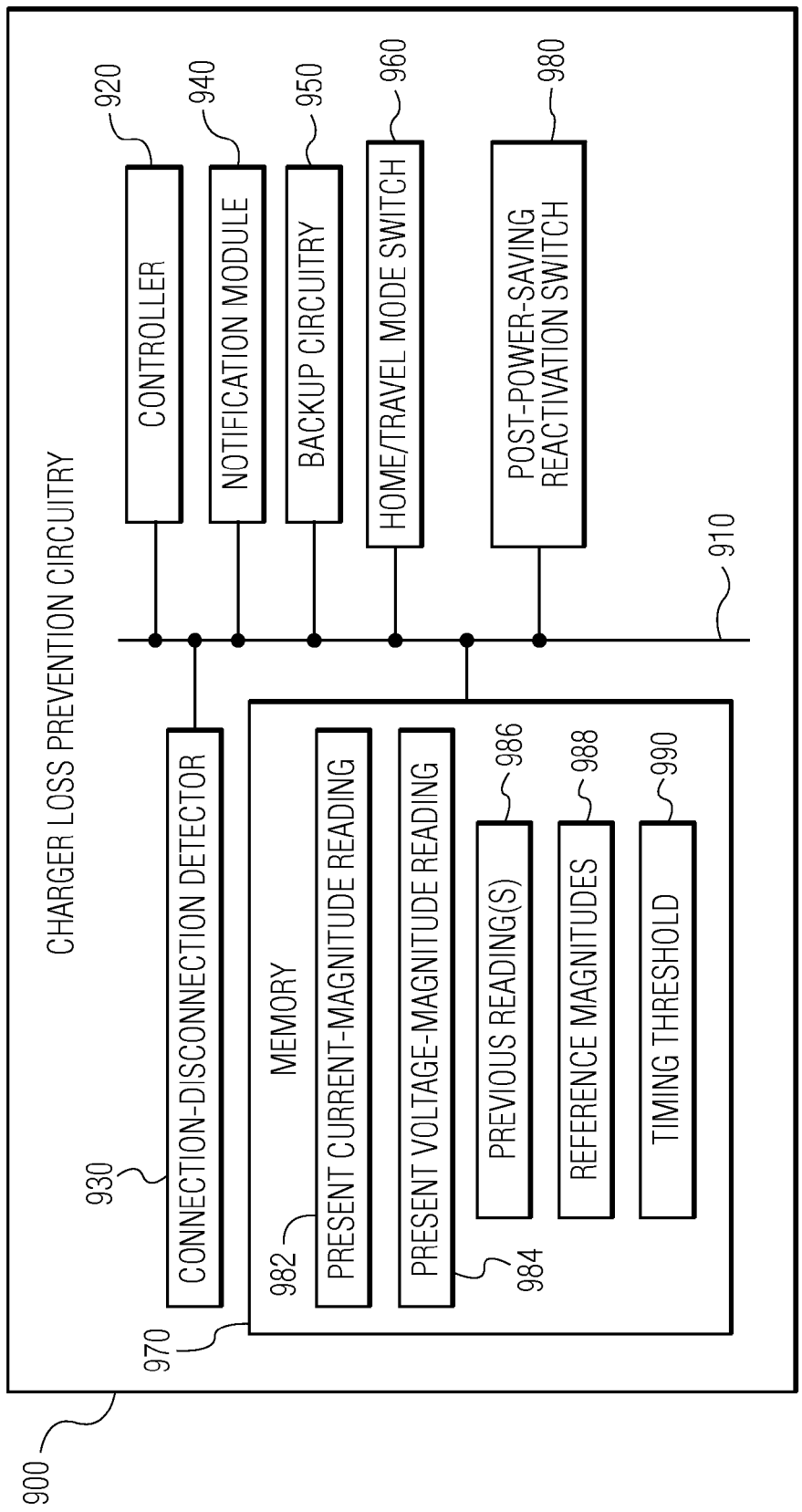
FIG. 9 is an exemplary schematic diagram of a second embodiment, in accordance with the invention.

FIG. 9 shows an overview of a second embodiment representing an exemplary version of the invention without Bluetooth™ wireless detection of an out-of-range condition. It also lacks wireless notification, although such could be included. It further lacks the engagement detector of the first embodiment, although an engagement detector could be part of this embodiment too.

Charger loss prevention circuitry 900 can be implemented as, for example, analog electronic components, a hybrid circuit, or a solid state device comprising an integrated circuit which includes any form of RAM, ROM, ASIC, PLD, or combination thereof, and can be implemented in software, firmware or hardware or any combination thereof. The circuitry 900 can be incorporated into the adaptor 304, and includes, connected to a data and control bus 910, a controller 920, a connection-disconnection detector 930, a notification module 940, backup circuitry 950 including a backup battery (not shown), a home/travel mode switch 960, a memory 970, and a post-power-saving reactivation switch 980.

The memory 970 is designed to include a present current-magnitude reading 982, a present voltage-magnitude reading 984, one or more previous readings 986, reference magnitudes 988, and a timing threshold 990, including working storage and storage for data and control information (not shown).

Figure 10:
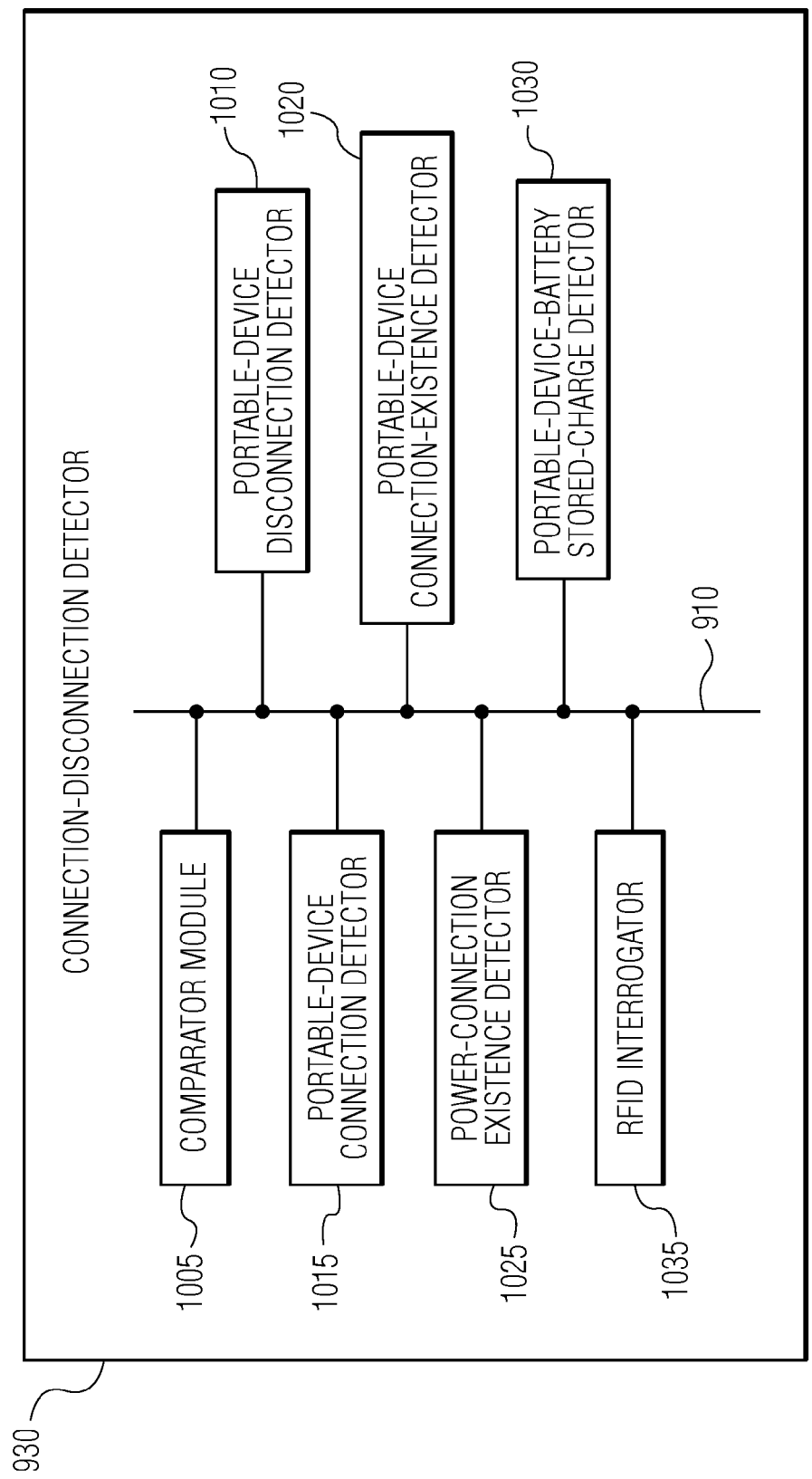
FIG. 10 is an exemplary schematic diagram of the connection-disconnection detector of the second embodiment.

As seen in FIG. 10, the connection-disconnection detector 930 includes a comparator module 1005, a portable-device disconnection detector 1010, a portable-device connection detector 1015, a portable-device connection-existence detector 1020, a power-connection existence detector 1025, a portable-device-battery stored-charge detector 1030, and a radio frequency identification (RFID) interrogator 1035 comprising a wireless transceiver.

Figure 11:
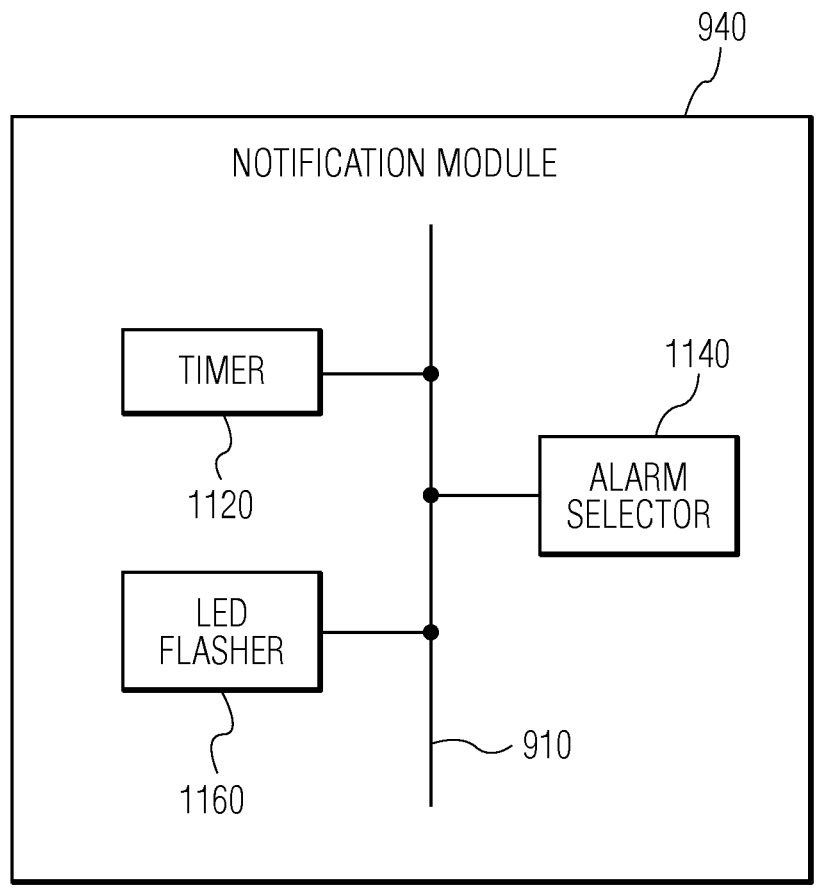
FIG. 11 is an exemplary schematic diagram of the notification module of the second embodiment.

FIG. 11 shows the notification module 940. It includes a timer 1120, an alarm selector 1140 and an LED flasher 1160.

Figure 12:
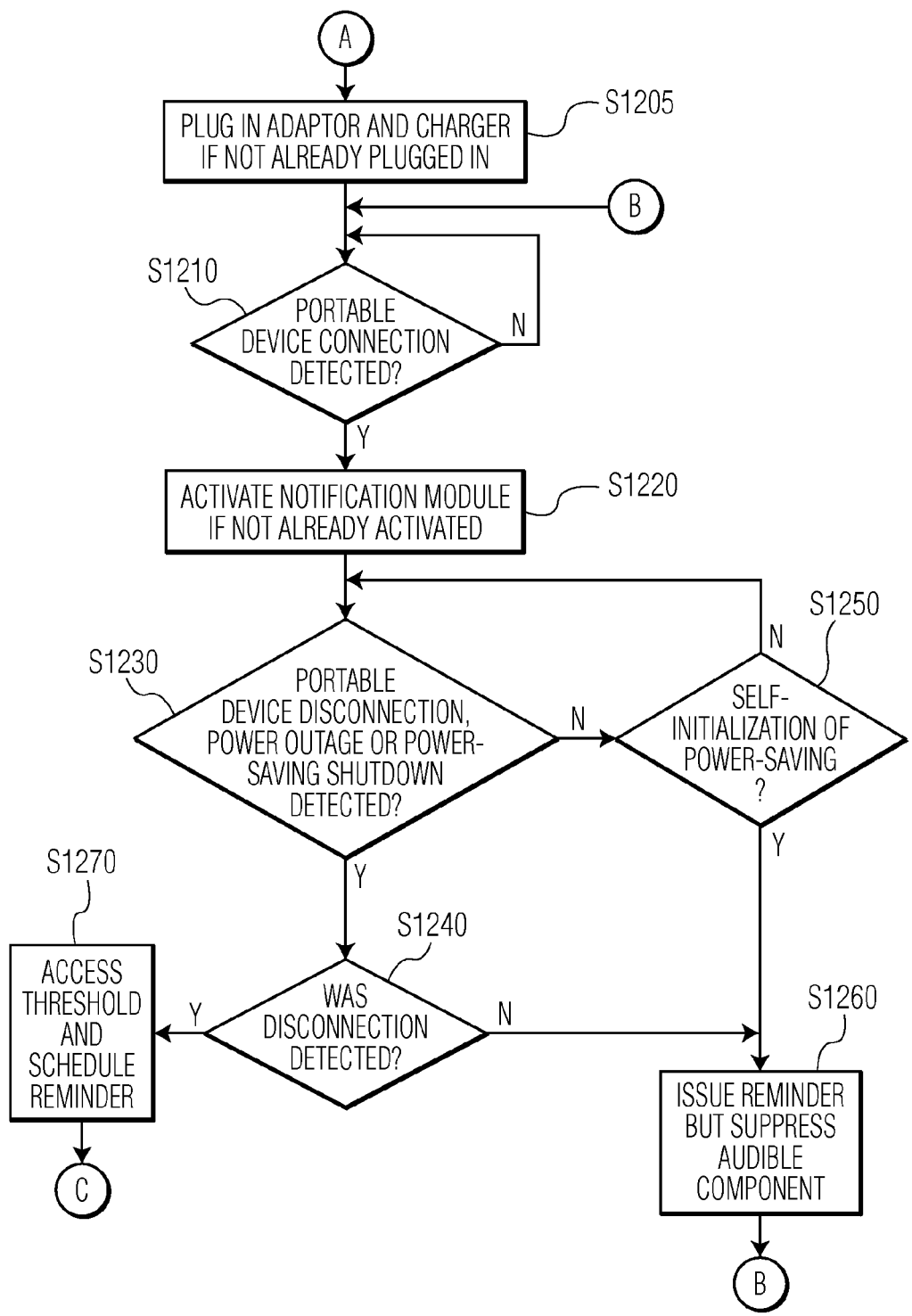
FIGS. 12, 13A-13C and 14A-14D are flow charts illustrating, collectively and by example, operation of the second embodiment.

Operationally, as seen in FIG. 12, the user 105 plugs in to the wall outlet 308 the adaptor 304 and the charger 316 (step S1205), if not already plugged in. At this point, or, in the case of an engagement detector, once it is detected that the adaptor 304 and the charger 316 are plugged in, the portable-device connection-existence detector 1020, monitors, by means of comparison made by the comparator module 1005 using the present current-magnitude reading 982 and the corresponding reference magnitude 988, whether the portable device 328 is connected (step S1210). When the portable-device connection-existence detector 1020 detects that the portable device 328 is connected, the status of the charger 316 reflects this, and the detector activates the notification module 940 if it is not already activated (step S1220).

Figure 8C:
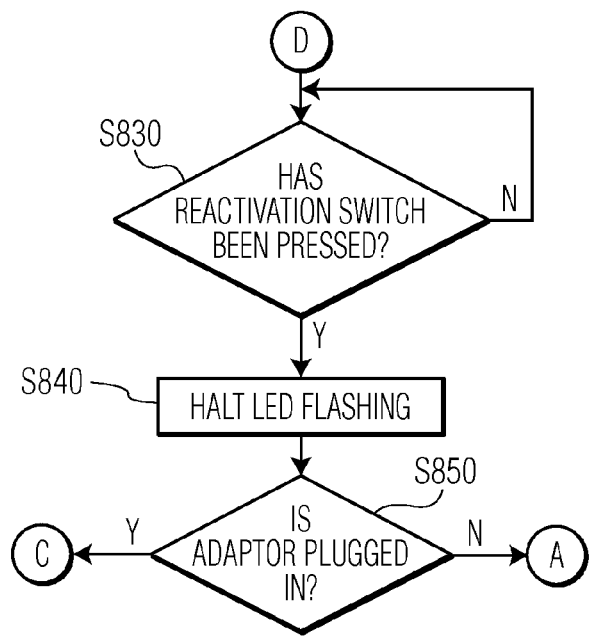

Then, by means of, collectively, the portable-device disconnection detector 1010, the portable-device-battery stored-charge detector 1030 and the comparator module 1005, monitoring commences for the occurrence of any one of: a) disconnection of the portable device, b) a power outage, and c) an externally-imposed power-saving shutdown (step S1230). Comparisons made to identify when any of the events a), b) and c) have occurred are analogous to those described herein above with respect to FIG. 8. Detection of an externally-imposed power-saving shutdown, for example, can be based on a sensed charging state of the battery 336, as discussed further above. As also mentioned above, the present, i.e., second, embodiment is assumed to lack an engagement detector. Consequently, the occurrence of a power outage is indistinguishable from the user unplugging the adaptor 304. Since, as noted below, it may be desirable to issue a reminder, in the form of LED flashing, in the case of a power outage, the reminder is likewise issued due to the unplugging when the adaptor is in travel mode. However, the resulting LED flashing can be terminated by the user 105 pressing the post-power-saving reactivation switch 980. Alternatively, as mentioned herein above, the second embodiment can be implemented with an engagement detector. In that case, a power outage would be distinguishable from the unplugging of the adaptor 304, and no flashing would occur in the latter event. Thus, the user 105 would be relieved of the need to press the switch 980 after having unplugged the adaptor 304. As a further alternative, the adaptor 304 can be designed without the power-outage-based reminder discussed immediately below, and thus there would be no need to press the switch 980 after having unplugged the adaptor 304.

In step S1230, if there is no detection of portable device disconnection, power outage or power-saving shutdown, and if there has been no self-initialization of power-saving (step S1250, "NO" branch), monitoring continues with a branch back to step S1230.

If, on the other hand, a power outage or power-saving shutdown has occurred (steps S1240, "NO" branch; or S1250, "YES" branch), the circuitry 900 will not, by the above techniques, any longer be able to detect whether the portable device 328 is disconnected. Consequently, as a precaution, a non-obtrusive reminder is issued (step S1260). Specifically, in issuing the reminder, the alarm selector 1140 suppresses the audible component, since, for example, it may now be in the middle of the night. The reminder may take the form of a visible component, such as a flashing LED 226 controlled by the LED flasher 1160, as described above in relation to the first embodiment. Processing then returns to step S1210.

Figures 13A, 13B, 13C:
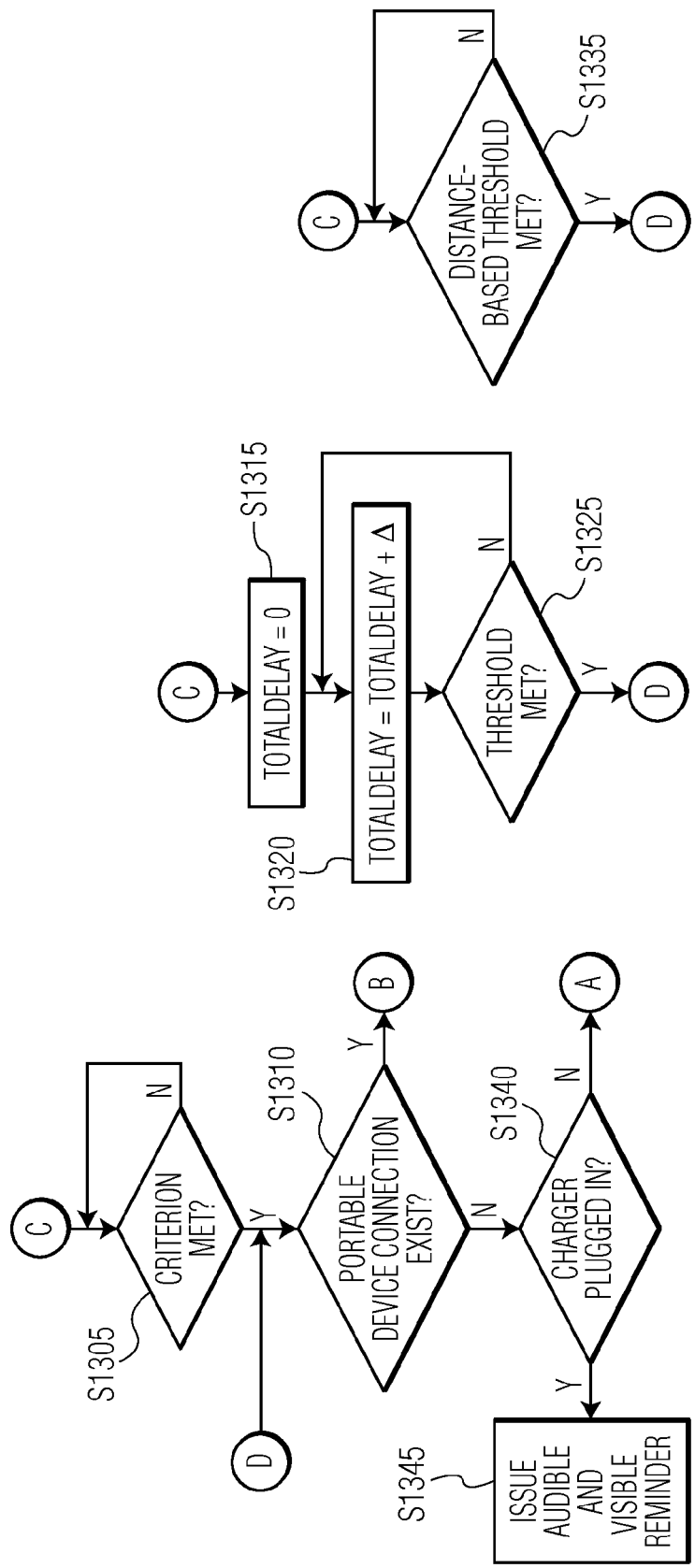
Figure 14A:
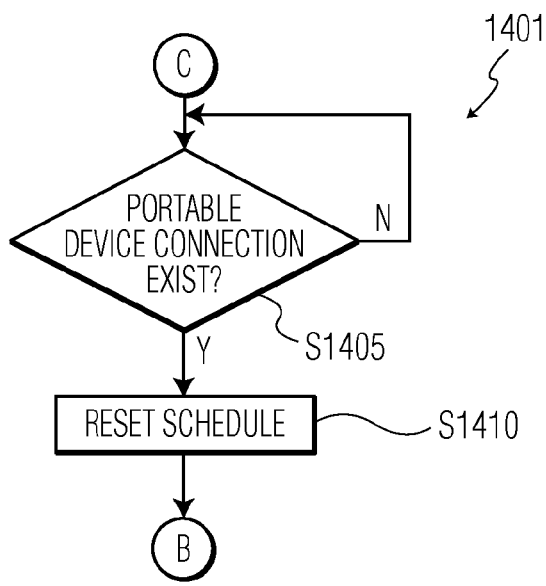
Figure 14B:
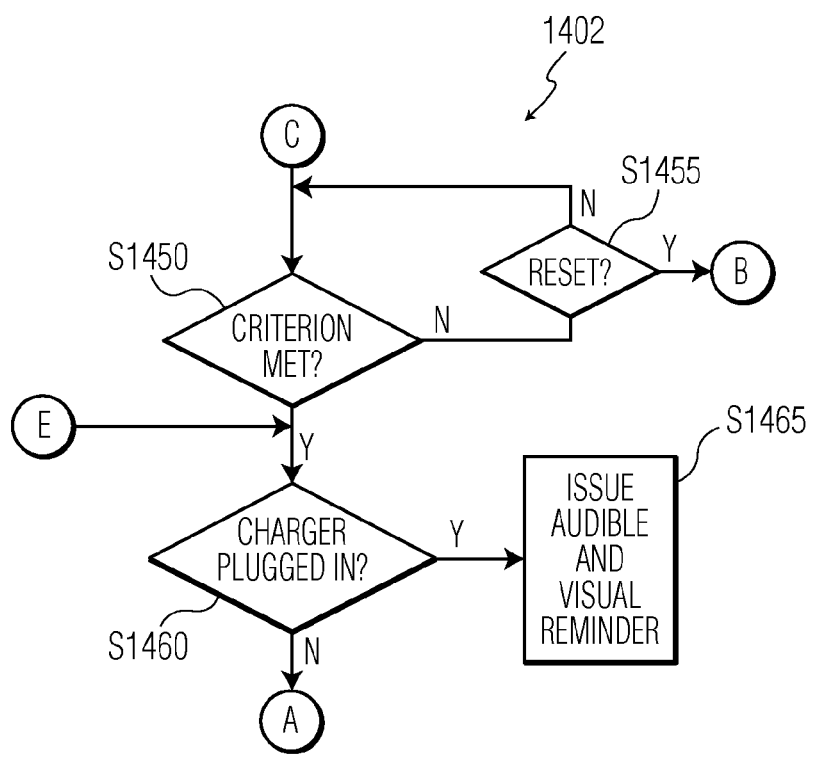
Figure 14C:
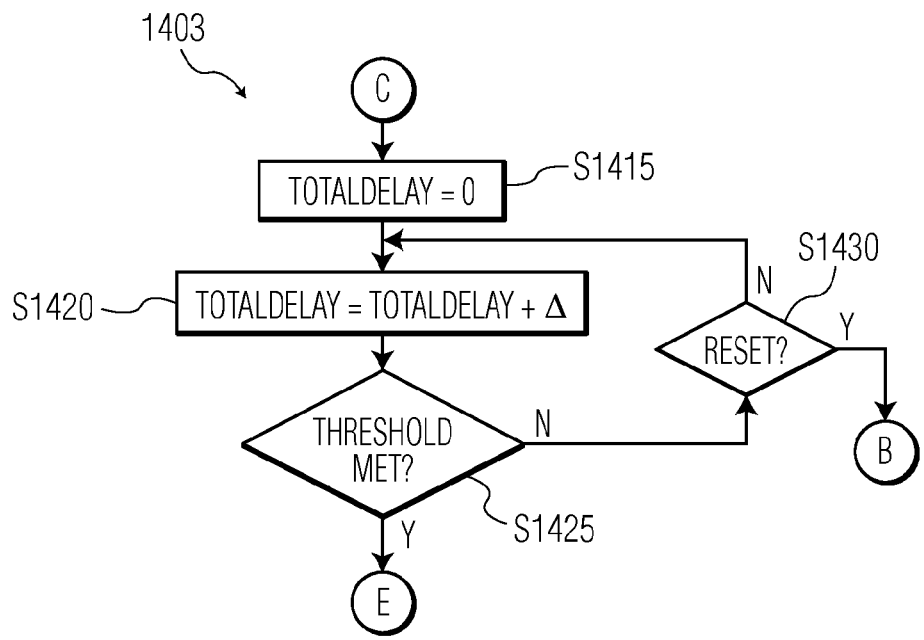

If, however, the portable-device disconnection detector 1010 detects, in real time, disconnection of the portable device 328, i.e., breaking of the connection (step S1240, "YES" branch), the connection status of the charger 316 reflects this, and the disconnection event is communicated in real time to the notification module 940. Likewise in real time, the reminder 138 is scheduled which, in the case of the timing threshold 990, means that, for example, the threshold is accessed for setting a countdown timer (step S1270). In effect, commencement of reminding the user 105 is scheduled so as to delay the commencement. Then, as represented in FIG. 13A or in FIGS. 14A, 14B, correspondingly one process executes or two sub-processes concurrently execute. Execution of the sub-process(es) delays, in effect, commencement of reminding the user 105. The delay affords leeway in the form of a grace time period that is predetermined in the case of a time criterion. In the case of a distance criterion, the delay persists until the distance, or out-of-range, criterion is met. The distance criterion in the steps S1335, S1440 is discussed herein above in the context of an RFID detection method. However, the criterion may instead, or in addition, apply to distance between the adaptor 304 and a Bluetooth™ paired portable device. Alternatively, the criterion may apply to distance between transceivers designed for any short-range communication, e.g., using ultra-wide band (UWB) or IEEE 802.11 (Wi-Fi) transceivers. Commencement of the reminder 138 is accordingly scheduled so as to delay the commencement.

Figure 14D:
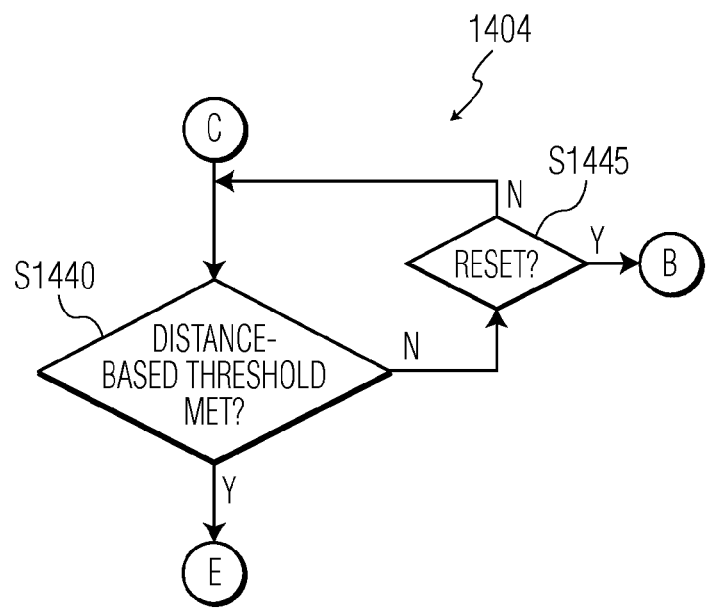

In accordance with an exemplary reset embodiment seen in FIG. 14A-14D, the circuitry 900 is configured to, upon detection, in real time, that the user 105 has re-connected the portable device 328 for charging soon after having disconnected it, immediately forgo issuing a reminder. This takes advantage of the grace time period. In particular, the circuitry 900 immediately resets the schedule that was created by the scheduling of a reminder, and, in addition, immediately reinitiates monitoring for disconnection of the portable device. To reset the schedule, as further seen in FIGS. 14A, 14B, a first sub-process 1401 interrupts an ongoing sub-process 1402 that is determining whether a predetermined criterion is met. As further shown in FIG. 14C, one version 1403 of a part of the ongoing sub-process 1402 executes to determine whether a predetermined time period has expired. Another version 1404 of that part executes, as shown in FIG. 14D, to determine whether the portable device 328 equipped with an RFID tag exceeds a predetermined distance from the RFID interrogator 1035 in the adaptor 304 after the disconnection. The RFID interrogator 1035 may alternatively be disposed within the charger 316, if, for example, the circuitry 900 is integrated into the charger.

For simplicity of further explanation, the no-reset version, as seen in FIGS. 13A-13C, is discussed herein below first.

Now that the reminder has been scheduled (step S1270), and after a predetermined criterion is met (step S1305), query is made as to whether the portable device is now re-connected (step S1310), i.e., as to the connection status of the charger 316, thereby avoiding any need for a reminder if the re-connection has been made.

The criterion can be, for example, a time-based criterion or a distance-based criterion.

For a time-based criterion, seen in FIG. 13B, first the variable TOTALDELAY is initialized to zero (step S1315). The variable TOTALDELAY is thereafter iteratively incremented by Δ (step S1320) until TOTALDELAY meets a threshold value (step S1325). The value Δ may, for example, be set equal to 1, an iteration occurring each second, with the threshold value being 6. The delay of, illustratively, 6 seconds gives the user 105, in view of step S1310, leeway to unplug and reconnect the portable device 328, or possibly move it from one outlet to another, without generating an alarm, e.g., audible reminder.

The distance-based criterion, depicted in FIG. 13C, which here is provided instead of, but can be in addition to, the time-based criterion, is based on distance between the adaptor-based, RFID interrogator 1035 and an RFID tag in the portable device 328. When movement of the portable device 328 causes a distance-based threshold to be met, as evidenced by the wireless connection 136 being broken (step S1335), the distance-based criterion is satisfied. The criterion can also be met by repeatedly detecting the distance and comparing the detected distance to a distance-based threshold until the threshold is met. The system 900 monitors for portable-device movement meeting the criterion.

Thus, for instance, if the threshold is 15 feet, an audible alarm may sound as the user 105 is down the hall or otherwise about to leave without having taken the adaptor 304, or adaptor and charger 316.

As with the reset version, the RFID interrogator 1035 may alternatively be disposed within the charger 316, if, for example, the circuitry 900 is integrated into the charger.

When respectively the time-based, or distance-based, criterion is satisfied (step S1305), query is made, as mentioned above, as to whether the portable device 328 is now re-connected (step S1310).

If the portable device 328 has been re-connected, which can be determined by matching the present current-magnitude reading 982 to its respective reference magnitude 990, processing returns to step S1210.

Even if the portable device 328 has not been re-connected, the user 105 need not necessarily be reminded to go back for the charger 316. The reminding is not needed if, as reflected in the charger connection status set by the power-connection-existence detector 1025, the charger is not plugged in, i.e., the charger is not in a state of being connected for powering from the electrical outlet 308 (step S1340). If the charger 316 is not plugged in, processing returns to step S1210.

If, on the other hand, the charger 316 is still plugged in or otherwise connected for receiving electrical power from a source external to the adaptor, such as the electrical outlet 308, audible and visual components of a reminder are issued (step S1345).

Determining whether to issue the reminder 138 is, accordingly, performed at the scheduled commencement of reminding in the present embodiment, and is based on a connection status of the charger 316.

The reminder 138 comes forth from a device for communicating the reminder to the user 105.

The visual component of the reminder 138 may, for instance, be or include the flashing of the LED 226. The audible component may be or include an alarm such as is found in a typical household smoke alarm. Optionally, only one of the components may be implemented, or actuated in accordance with output of the alarm selector 1140. Also, it can be inconvenient to replace a lost charger which is associated with a particular type of portable device; whereas, the adaptor 304 may be more generalized. Nevertheless, a check can also be made, in connection with step S1340, on whether the adaptor 304 is plugged in, even if the charger 316 is not, to remind the user 105 to retrieve the adaptor. Optionally, on the other hand, the issuing of the reminder 138 can be subject to the charger 316 being in a state of being connected for powering from the outlet 308.

Considering now, once again, the reset version of FIGS. 14A-14D, now that the reminder has been scheduled (step S1270), the first sub-process 1401 monitors in real time for re-connection of the portable device 328 for charging (step S1405). If, and when, re-connection occurs before a reminder issues, as reflected in the charger connection status set by the portable-device-connection detector 1015, the schedule is reset (step S1410). In particular, the current schedule is foregone, and monitoring for a disconnection event represented by step S1210 is reinitiated.

With respect to the second sub-process 1402, the steps S1415, S1420, S1425 for the time-based criterion are analogous to the afore-discussed steps S1315, S1320, S1325 for the time-based criterion of the no-reset version, except that iteration is interrupted (step S1430), in the event that the schedule is reset (step S1410). In case of interruption, processing returns to step S1210.

Likewise for the distance-based criterion, the reset-version, distance-based criterion step S1440 is analogous to the step S1335 for the distance-based criterion of the no-reset version, except that iteration is interrupted (step S1445), in the event that the schedule is reset (step S1410). In case of interruption, processing returns to step 1210.

The second sub-process 1402, executing concurrently with the first sub-process 1401, monitors, in iterations that are likewise subject to interruption (step S1455), for the respective predetermined criterion 1403, 1404 being met (step S1450). Upon the respective predetermined criterion 1403, 1404 being met (step S1450), or, equivalently and respectively, processing into the YES branch in step S1425 or S1440, query is made as to whether the charger 316 is plugged in (step S1460). If the charger 316 is not in a "plugged in" state, there is no need to notify the user 105, and processing returns to step S1205. On the other hand, if the charger 316 is still plugged in, i.e., in a "plugged in" state, audible and visible components of a reminder issue (step S1465). Here, too, as in the no-reset version, an additional check can optionally be made as to whether the adaptor 304 is plugged in.

Each of the time- and distance-based criteria 1403, 1404 may be implemented with the predetermined threshold, i.e., distance or length of time, being adjustable by the user through actuation of a control such as one or more buttons, dials, etc.

A reminder system for a portable-device charger is designed for determining when it is likely that the charger is about to be left behind. Detection which may be in real time can pertain, depending on the embodiment, to disconnection of a portable device from the charger, and/or movement of a portable device out of wireless range of the charger or a charger adaptor. In some versions, the onset of reminding is, upon detecting disconnection, tentatively postponed until a predetermined criterion is met, such as expiry of a predetermined time period. Or the criterion can be detection of an out-of-range condition based on distance between the portable device and an adaptor or charger. In some embodiments detection and reminder issuance are incorporated in a unit, such as a plug-in wall adaptor or the charger itself. The adaptor can be generalized rather than specialized for a charger of a particular make or model. The system can be unobtrusive, and sensitive to the charger connection status, power saving and power outages Besides preventing inadvertent loss of a charger when the user is away from home, the novel adaptor can prevent its own loss, and can execute power-saving shutdown in "no-load" and full-charge situations. It optionally can be made capable of distinguishing the latter situations from a power outage, which is potentially temporary, so as to avoid a superfluous or premature reminder. Like most mobile-device chargers, the adaptor has a small form-factor suitable for a travel accessory. In addition, the adaptor need not be disconnected from the charger when the user is back home; but, instead, can conveniently be switched by the user into home mode and utilized for its power-saving feature. More particularly, the adaptor is universal in that it can be generalized for use with any number of chargers without being limited to any single make or model. Optionally, a user can, by means of a personal computer for example, connect to a website and select charging profiles of specific devices. The profiles are then wirelessly transmitted, as disclosed in U.S. Patent Publication No. 2008/0007212 to Theytaz et al., in the present context the transmission being to the adaptor. Also, although a consumer need not purchase but one adaptor, an alternative is to purchase multiple ones to leave connected to various chargers for convenience and for their energy-saving feature. Advantageously, since the adaptor is generalized, it can conveniently be obtained at many sales outlets. In fact, as mentioned above, the adaptor can alternatively be implemented appurtenant to a standard wall outlet of a home or hotel room.

While the invention has been illustrated and described in detail in the drawings and foregoing description, such illustration and description are to be considered illustrative or exemplary and not restrictive; the invention is not limited to the disclosed embodiments.

For example, wireless notification is not limited to text messaging, and may involve voicemail. Nor is wireless notification limited to Bluetooth™ embodiments or embodiments based on any other short-range wireless protocol, but instead may be used in, or supplement, notification triggered by time- or distance-based thresholds. As another example, the adaptor 204 may feature merely one of the resilient toggle buttons 208, 216. Also, the adaptor can, at the expense of the small form-factor advantage noted above, be alternatively incorporated into an alarm clock such as the one shown in Slusky. Such an embodiment can, optionally, instead of being designed for placement flush against the wall, be provided with a cord having a wall plug at one end. Alternatively, the adaptor can be designed for plugging into a charging receptacle of a motor vehicle such as a bus, the distance or time threshold being set lower, so that the traveler can be reminded to take the charger and adaptor when exiting the vehicle.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

A computer program can be stored momentarily, temporarily or for a longer period of time on a suitable computer-readable medium, such as an optical storage medium or a solid-state medium. Such a medium is non-transitory only in the sense of not being a transitory, propagating signal, but includes other forms of computer-readable media such as register memory, processor cache and RAM.

A single processor or other unit may fulfill the functions of several items recited in the claims. The mere fact that certain measures are recited in mutually different dependent claims does not indicate that a combination of these measured cannot be used to advantage.

What is claimed is:

1. A unit connectable for charging a portable device and configured to prevent leaving behind a portable-device battery charger when a battery chargeable by said charger is disconnected from said charger, said unit comprising:
  a detector configured for detecting the disconnection; and
  a notification module configured for, responsive to detection of said battery being disconnected from said charger and to prevent said leaving behind, issuing a reminder, said issuing being further responsive to at least one of the following events:
    a) distance between said unit and said portable device exceeding a predetermined threshold; and
    b) expiry of a time period, said period starting after said detection of said battery being disconnected from said charger.

2. The unit of claim 1, said detection occurring in real time response to said disconnection.

3. The unit of claim 1, said portable device being a handheld device.

4. Circuitry configured for reminding a user to thereby prevent a battery charger from being left behind and for determining that disconnection of a portable device from said charger has occurred, said circuitry comprising:
  a notification module configured for, responsive to said determining that said disconnection has occurred, delaying commencement of said reminding.

5. The circuitry of claim 4, configured such that said delaying is for a grace time period for said user within which said user is afforded an opportunity for preventing said commencement.

6. The circuitry of claim 4, comprising a radio frequency identification (RFID) interrogator for determining whether a predetermined distance criterion is met, said circuitry configured for commencing, upon said criterion being met, a reminder scheduled upon said detecting of said event.

7. The circuitry of claim 4, said module being further configured for determining whether to issue a reminder.

8. The circuitry of claim 7, said determining being performed at said commencement of reminding, said commencement having been scheduled.

9. The circuitry of claim 7, said determining being based upon a connection status of said charger at a time subsequent to said disconnection event.

10. The circuitry of claim 9, further comprising a portable-device-connection-existence detector configured for detecting, by said circuitry at said time subsequent, whether there exists a connection of a portable device to said charger so as to be charged by said charger, said status being representative of a result of said detecting by said portable-device-connection-existence detector.

11. The circuitry of claim 9, further comprising a power-connection-existence detector configured for detecting whether there exists, to a source external to said charger, a connection of said charger for receiving power by which to charge a portable device connectable to said charger for charging, said status being representative of a result of said detecting by said power-connection-existence detector.

12. The circuitry of claim 9, further comprising a portable-device-connection detector for detecting connection of a portable device to said charger so as to be charged by said charger, said status reflecting, in event of said connection, said connection.

13. The circuitry of claim 4, said charger being configured for charging a battery configured for powering said device.

14. The circuitry of claim 4, the disconnection of said device electrically disconnecting said battery from said charger.

15. The circuitry of claim 4, said charger configured for being plugged in to a source of electrical power.

16. The circuitry of claim 4, said module being further configured for, based on a determined charging state of a battery, shutting off power to said charger and suppressing an audible component of said reminding.

17. An adaptor comprising the circuitry of claim 4, said adaptor configured for detachable electrical connection both to said charger, and to a source of electrical power for charging by said charger.

18. The adaptor of claim 17, further comprising a switch by which said module is switchable by a user into a state that is inactive but allows said adaptor to still convey from said source, to said charger, said power, and by which said module is switchable back into an active state.

19. A user-alerting charger comprising, as a single, integrated unit, the circuitry of claim 4 and said charger.

20. A computer readable medium for preventing leaving behind a battery charger for a portable device when a battery of said device is disconnected from said charger, said medium comprising instructions executable by a processor to perform a plurality of acts, said plurality comprising the acts of:

detecting, by an adaptor that includes said computer readable medium and to which said charger is connectable for charging, the disconnection; and responsive to detection of said battery being disconnected from said charger and to prevent said leaving behind, issuing, by said adaptor, a reminder, said issuing being further responsive to at least one of the following events:
a) distance between said unit and said portable device exceeding a predetermined threshold; and
b) expiry of a time period, said period starting after said detection of said battery being disconnected from said charger.

21. The unit of claim 1, said issuing being responsive to said expiry.

22. The unit of claim 21, said issuing being in real time response to said expiry.

23. The unit of claim 21, said period being of predetermined length.

24. The unit of claim 21, further configured to, in case said battery is reconnected to said charger after said detection but prior to said expiry, forgo performing said issuing.

25. The unit of claim 24, further configured for alerting, by the issued reminder, a user who has performed said disconnection, and for said alerting while said user is still in a vicinity of said unit.

26. The unit of claim 25, said length being 6 seconds.

27. The unit of claim 21, further configured such that said period is a grace time period for a user of said unit, within which period said user is afforded an opportunity to prevent said issuing.

28. The unit of claim 1, further configured with a user switch for inactivating said issuing.

29. The unit of claim 1, further configured as an adaptor to which said charger is connectable for charging and designed such that unplugging said adaptor terminates said reminder.

30. The unit of claim 1, further configured with a user switch for halting said issuing.

31. The unit of claim 30, said switch being manually actuatable.

32. The unit of claim 31, said switch being a manual switch.

33. The unit of claim 1, further configured for said reminder timing out.

34. The unit of claim 1, said issuing being subject to said unit being in a state of being connected for powering from an electrical outlet.

35. The unit of claim 34, configured for said issuing even when said unit is not receiving power from said outlet.

36. The unit of claim 1, further configured as an adaptor for conveying electrical power to said charger.

37. The unit of claim 1, further configured for detecting that said charger is connected for receiving electrical power, said issuing being subject to detection that said charger is connected for said receiving.

38. The unit of claim 1, the connection of said unit for charging said portable device comprising a detachable connection.

39. The unit of claim 38, said detachable connection comprising a connection to said charger.

40. The unit of claim 1, said issuing being responsive to said exceeding.

41. The unit of claim 1, configured for a travel mode of operation and another mode of operation.

42. The unit of claim 41, said travel mode for said issuing, said unit further comprising a user switch for switching between said travel mode and, as said another mode, a home mode of operation for which said issuing is inactivated.

43. The unit of claim 1, said disconnection occurring via a disconnection event in which said battery is disconnected from said charger, said detection being in real time response to said event.

44. The unit of claim 43, configured for scheduling said reminder in real time response to said event.

45. The unit of claim 1, said disconnection occurring via a disconnection event in which said battery is disconnected from said charger, said unit configured for, in real time response to said event, scheduling commencement of reminding, said reminding to occur upon said expiry.

46. The unit of claim 1, said disconnection occurring via a disconnection event in which said battery is disconnected from said charger, said unit configured for, in real time response to said event, starting a timer, the responsiveness of said issuing to said expiry entailing responsiveness to said timer.

47. The unit of claim 1, comprising a housing and configured with a travel-accessory form factor that includes the rounding of an edge of said housing.

48. The unit of claim 1, the responsiveness of said issuing to said detection being automatic and without need for user intervention.

49. The unit of claim 1, implemented as an adaptor connectable directly to an electrical outlet.

50. The unit of claim 49, configured for providing, to said charger, power from said outlet.

51. The unit of claim 49, said issuing being subject to said charger being in a state of being connected for powering from said outlet.

52. The unit of claim 49, said outlet being a wall outlet.

53. The unit of claim 1, said issuing being further responsive to expiry of a predetermined time period that starts upon the disconnection from said charger.

54. The unit of claim 53, said issuing being in real time response to said expiry.

55. The unit of claim 1, said issuing being subject to said unit being in a state of being connected for powering from an electrical outlet.

56. The unit of claim 1, said disconnection occurring by detachment, from said charger, of a portable device to which said battery is attached.

57. The unit of claim 56, said detachment occurring by unplugging, from said charger, said portable device to which said battery is attached.

58. The unit of claim 1, implemented as a plug-in unit.

59. The unit of claim 1, configured such that communication, to said module, of said disconnection, occurs in real time.

60. The unit of claim 1, designed for said issuing only if at least one of:
a) said charger; and
b) an adaptor for powering said charger is plugged in for receiving power from an electrical outlet.

61. The unit of claim 1, said unit being a unit separate from said device.

62. The unit of claim 4, said delaying being for a predetermined length of time.

63. The circuitry of claim 4, said disconnection occurring via a disconnection event in which said battery is disconnected from said charger, said circuitry configured for, in real time response to said event, starting a timer for said delaying.

64. The circuitry of claim 4, further configured for taking, for purposes of and prior to said determining, multiple readings of current flowing to said charger, and for using a plurality of said readings in said determining, said determining deciding whether or not to perform said reminding, said delaying being responsive to the decision.

65. The unit of claim 20, the responsiveness of said issuing to said detection being automatic and without need for user intervention.

66. The unit of claim 20, said period being of predetermined length.

67. A portable-device battery charger comprising the unit of claim 21 and configured for independently detecting said disconnection.

68. The unit of claim 34, comprising said charger.

69. The unit of claim 21, configured for performing, without need for wireless communication outside said unit, the responding to said detection with said issuing.

70. The unit of claim 40, said issuing being in real time response to said exceeding.

71. The unit of claim 21, comprising said charger.

72. The unit of claim 40, the responsiveness to said exceeding being responsiveness is a less immediate sense than the responsiveness to said detection.

* * * * *